(12) United States Patent
Lo et al.

(10) Patent No.: US 10,902,474 B2
(45) Date of Patent: Jan. 26, 2021

(54) TARGETED ADVERTISEMENT INSERTION FOR STREAMING MEDIA DATA

(71) Applicant: QUALCOMM Incorporated, San Diego, CA (US)

(72) Inventors: Charles Nung Lo, San Diego, CA (US); Thomas Stockhammer, Bergen (DE); Gordon Kent Walker, Poway, CA (US); Jun Wang, Poway, CA (US); Nagaraju Naik, San Diego, CA (US); Carlos Marcelo Dias Pazos, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 940 days.

(21) Appl. No.: 14/665,500

(22) Filed: Mar. 23, 2015

(65) Prior Publication Data

US 2015/0269629 A1    Sep. 24, 2015

Related U.S. Application Data

(60) Provisional application No. 61/973,063, filed on Mar. 31, 2014, provisional application No. 61/969,707, filed on Mar. 24, 2014.

(51) Int. Cl.
*G06Q 30/02* (2012.01)
*H04L 29/08* (2006.01)
(Continued)

(52) U.S. Cl.
CPC ..... *G06Q 30/0269* (2013.01); *H04L 65/4084* (2013.01); *H04L 65/605* (2013.01);
(Continued)

(58) Field of Classification Search
CPC ........................... G06Q 30/0207–0277
(Continued)

(56) References Cited

U.S. PATENT DOCUMENTS

2007/0027751 A1    2/2007   Carson et al.
2010/0299702 A1   11/2010   Lo et al.
(Continued)

FOREIGN PATENT DOCUMENTS

CN        101233537 A        7/2008
WO      2010123207 A2       10/2010
(Continued)

OTHER PUBLICATIONS

DASH Industry Forum, "Ad Insertion in DASH Architectures and Guidelines", Jan. 7, 2014 (Year: 2014).*
(Continued)

*Primary Examiner* — Luis A Brown
*Assistant Examiner* — Richard G Reinhardt
(74) *Attorney, Agent, or Firm* — Qualcomm Incorporated

(57) ABSTRACT

In one example, a method of retrieving media data includes, by a multimedia broadcast multicast service (MBMS) client of a client device: receiving advertisement media data of one or more advertisement groups, receiving an identifier value for one of the advertisement groups from a dynamic adaptive streaming over HTTP (DASH) client of the client device, extracting the advertisement media data of the advertisement group corresponding to the identifier value, and providing the extracted advertisement media data to the DASH client.

25 Claims, 23 Drawing Sheets

(51) Int. Cl.

| | | |
|---|---|---|
| *H04N 21/258* | (2011.01) | |
| *H04N 21/442* | (2011.01) | |
| *H04N 21/45* | (2011.01) | |
| *H04N 21/81* | (2011.01) | |
| *H04N 21/854* | (2011.01) | |
| *H04N 21/845* | (2011.01) | |
| *H04L 29/06* | (2006.01) | |

(52) U.S. Cl.
CPC ............ *H04L 65/608* (2013.01); *H04L 67/02* (2013.01); *H04N 21/25883* (2013.01); *H04N 21/25891* (2013.01); *H04N 21/44209* (2013.01); *H04N 21/4524* (2013.01); *H04N 21/4532* (2013.01); *H04N 21/812* (2013.01); *H04N 21/8456* (2013.01); *H04N 21/85406* (2013.01)

(58) Field of Classification Search
USPC .................................................. 705/14, 319
See application file for complete search history.

(56) References Cited

U.S. PATENT DOCUMENTS

| | | | |
|---|---|---|---|
| 2012/0259946 A1 | 10/2012 | Stockhammer et al. | |
| 2012/0259994 A1* | 10/2012 | Gillies ................ | H04L 65/4076 709/231 |
| 2015/0149279 A1* | 5/2015 | Kotecha ............. | G06Q 30/0255 705/14.53 |

FOREIGN PATENT DOCUMENTS

| | | |
|---|---|---|
| WO | 2012138909 A1 | 10/2012 |
| WO | 2013036451 A1 | 3/2013 |
| WO | 2014011097 A1 | 1/2014 |

OTHER PUBLICATIONS

3GPP, "3rd Generation Partnership Project; Technical Specification Group Services and System Aspects; Multimedia Broadcast/Multicast Service (MBMS); Protocols and codecs (release 11)", Dec. 2012 (Year: 2012).*

Second Written Opinion from International Application No. PCT/US2015/022257 dated Apr. 1, 2016, 8 pp.

Response to Second Written Opinion dated Apr. 1, 2016 in International Application No. PCT/US2015/022257 filed on Jun. 1, 2016, 7 pp.

International Preliminary Report on Patentability from International Application No. PCT/US2015/022257 on Jun. 29, 2016, 9 pp.

Response to Written Opinion dated Jul. 8, 2015 in International Application No. PCT/US2015/022257 filed on Jan. 14, 2016, 6 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (For FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

"3rd Generation Partnership Project; Technical Specification Group Services and System Aspects; Multimedia Broadcast/Multicast Service (MBMS); Enhanced MBMS Operation (Release 12)", 3GPP Draft; 26848-100, 3rd Generation Partnership Project (3GPP), Mobile Competence Centre; Mar. 5, 2014, XP050802611, 38 pp.

DVB Organization: "TM-3039-Advert Insertion using MPEG DASH final.pdf", DVB, Digital Video Broadcasting, C/0 EBU—17A Ancienne Route—CH-1218 Grand Saconnex, Geneva—Switzerland, May 15, 2013, XP017841134, 42 pp.

DVB Organization.,"DASH-AdInsertion-draft_r36b.docx", DVB, Digital Video Broadcasting, C/O EBU-17A Ancienne Route—CH-1218 Grandsaconnex, Geneva—Switzerland, Jan. 7, 2014; XP017844527, 26 pp.

"3rd Generation Partnership Project; Technical Specification Group Services and System Aspects; Multimedia Broadcast/Multicast Service (MBMS); Enhanced MBMS Operation (Release 11)" 3GPP TS 26.346 V11.3.0, Dec. 2012, 168 pp.

"3rd Generation Partnership Project; Technical Specification Group Services and System Aspects; Multimedia Broadcast/Multicast Service (MBMS); Protocols and codecs (Release 12)" 3 GPP TS 26.346 v12.4.0, Dec. 2014, 207 pp.

"3rd Generation Partnership Project; Technical Specification Group Services and System Aspects; Multimedia Broadcast/Multicast Service (MBMS); Enhanced MBMS operation (Relase 12)", 3 GPP TR 26.848 v12.0.0, Dec. 2014, 61 pp.

Fielding, et al., "Hypertext Transfer Protocol—HTTP/ 1.1," Network Working Group, RFC 2616, Jun. 1999, 160 pp.

Paila, et al., "FLUTE—File Delivery over Unidirectional Transport," Internet Engineering Task Force, FC 6726, Nov. 2012, 46 pp.

International Search Report and Written Opinion from International Application No. PCT/US2015/022257, dated Jul. 8, 2015, 14 pp.

3rd Generation Partnership Project; Technical Specification Group Services and System Aspects; Multimedia Broadcast/Multicast Service (MBMS); Protocols and codecs (Release 12), 3GPP TS 26.346 V12.1.0 (Mar. 2014), Mar. 17, 2014, 181 Pages, URL: http://www.3gpp.org/ftp/Specs/archive/26_series/26.346/26346-c10.zip (26346-c10.doc).

* cited by examiner

TARGETED ADVERTISEMENT INSERTION FOR STREAMING MEDIA DATA

This application claims the benefit of U.S. Provisional Application Ser. No. 61/969,707, filed Mar. 24, 2014, and U.S. Provisional Application Ser. No. 61/973,063, filed Mar. 31, 2014, the entire contents of each of which are hereby incorporated by reference.

TECHNICAL FIELD

This disclosure relates to transport of media data, e.g., streaming of media data using a broadcast transport service.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data (and/or other media data, such as audio and/or timed text data) has been encoded, the media data may be packetized for transmission or storage. The packetized media data may be sent using a unicast protocol, such as hypertext transfer protocol (HTTP), or a broadcast or multicast protocol, such as Enhanced Multimedia Broadcast Multicast Service (eMBMS).

SUMMARY

In general, this disclosure describes techniques related to insertion of targeted advertisements into media data. In particular, a media application may provide user details and/or user data (e.g., a selection of user preferences) to a streaming client, such as a dynamic adaptive streaming over HTTP (DASH) client. The streaming client may provide corresponding data to a broadcast or multicast middleware unit. The middleware unit may receive data for one or more advertisement groups from a broadcast or multicast server, and then select one of the advertisement groups based on the data from the streaming client. Alternatively, the streaming client may provide an identifier for one of the advertisement groups to the middleware unit, e.g., when activating (that is, dereferencing) a link that includes a substitution attribute corresponding to an identifier for an advertisement group, by inserting the identifier as a value for the attribute into the link.

In one example, a method of retrieving media data includes, by a dynamic adaptive streaming over HTTP (DASH) client, determining a set of advertisement group identifiers associated with advertisement media data of a plurality of advertisement groups, wherein the advertisement media data is to be played during an advertisement break for main media content, wherein the main media content is associated with a manifest file, retrieving an update to the manifest file, wherein the update defines a remote Period that corresponds to the advertisement media data, wherein the update to the manifest file specifies a template for an extensible markup language (XML) linking language (XLink) uniform resource locator (URL) including an identifier attribute, selecting, based at least in part on characteristics of a user for the DASH client, one of the advertisement groups from the set, assigning, according to the template, an identifier value corresponding to the selected advertisement group to the identifier attribute of the XLink URL according to the template, dereferencing the XLink URL including the identifier value corresponding to the selected advertisement group to retrieve advertisement media data of the selected advertisement group from the remote Period, and providing the advertisement media data to a media application.

In another example, method of retrieving media data includes, by a multimedia broadcast multicast service (MBMS) client of a client device, receiving advertisement media data of one or more advertisement groups, receiving an extensible markup language (XML) linking language (Xlink) uniform resource locator (URL) including an identifier value for one of the advertisement groups from a dynamic adaptive streaming over HTTP (DASH) client of the client device, extracting the advertisement media data of the advertisement group corresponding to the identifier value, and providing the extracted advertisement media data to the DASH client.

In another example, a computer-readable storage medium has stored thereon instructions that, when executed, cause a processor of a client device to determine a set of advertisement group identifiers associated with advertisement media data of a plurality of advertisement groups, wherein the advertisement media data is to be played during an advertisement break for main media content, wherein the main media content is associated with a manifest file, retrieve an update to the manifest file, wherein the update defines a remote Period that corresponds to the advertisement media data, wherein the update to the manifest file specifies a template for an extensible markup language (XML) linking language (XLink) uniform resource locator (URL) including an identifier attribute, select, based at least in part on characteristics of a user of the client device, one of the advertisement groups from the set, assign, according to the template, an identifier value corresponding to the selected advertisement group to the identifier attribute of the XLink URL according to the template, dereference the XLink URL including the identifier value corresponding to the selected advertisement group to retrieve advertisement media data of the selected advertisement group from the remote Period, and provide the advertisement media data to a media application.

In another example, a computer-readable storage medium having stored thereon instructions that, when executed, cause a processor of a client device to receive advertisement media data of one or more advertisement groups, receive an extensible markup language (XML) linking language (Xlink) uniform resource locator (URL) including an identifier value for one of the advertisement groups from a dynamic adaptive streaming over HTTP (DASH) client of the client device, extract the advertisement media data of the advertisement group corresponding to the identifier value, and provide the extracted advertisement media data to the DASH client.

In another example, a method of retrieving media data includes, by a multimedia broadcast multicast service (MBMS) client of a client device, receiving an extensible markup language (XML) linking language (XLink) uniform resource locator (URL) including an identifier attribute for a remote Period that corresponds to advertisement media data from a dynamic adaptive streaming over HTTP (DASH) client of the client device, receiving data (e.g., a file delivery table (FDT) or a Filter Description fragment including a groupIDFilter syntax element) for the remote Period via a broadcast transport or a multicast transport, determining that the data for the remote Period matches the XLink URL when data of the broadcast transport or the multicast transport includes an identifier value that matches the identifier value of the XLink URL, and in response to determining that the data for the remote Period matches the XLink URL, delivering the data for the remote Period to the DASH client.

The details of one or more examples are set forth in the accompanying drawings and the description below. Other features, objects, and advantages will be apparent from the description and drawings, and from the claims.

DETAILED DESCRIPTION

Figure 1:
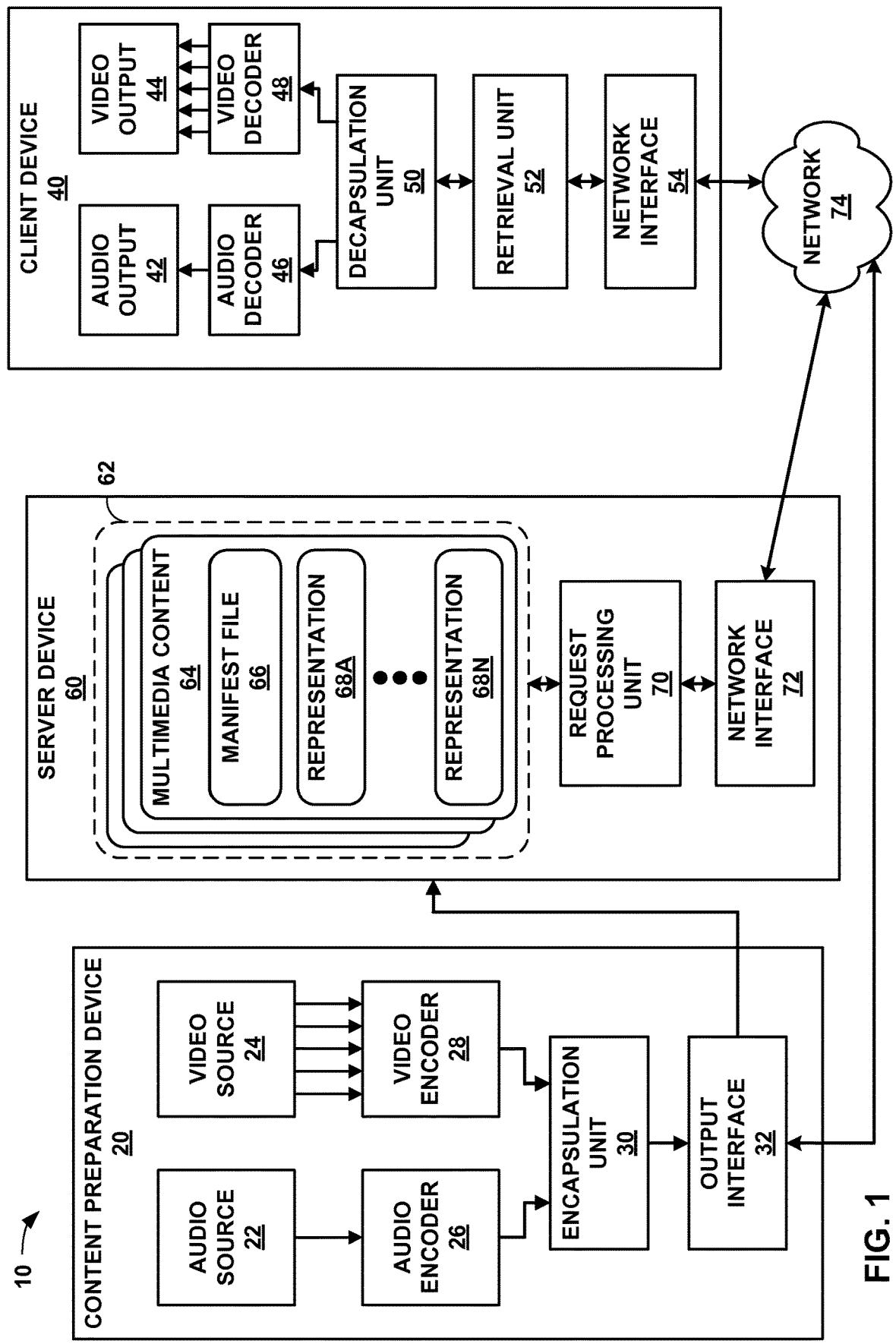
FIG. 1 is a block diagram illustrating an example system that implements techniques for streaming media data over a network.

In general, this disclosure describes techniques for targeted advertisement (ad) insertion. These techniques may be used when streaming media data, e.g., according to a unicast, broadcast, or multicast service, such as Enhanced Multimedia Broadcast Multicast Service (eMBMS). For example, the techniques of this disclosure may be used in conjunction with, or to augment the techniques of, MBMS Improvements-Enhanced MBMS Operation (MI-EMO). MI-EMO is described in, e.g., Overview of 3GPP Release 12 V0.1.1, December 2013, available at http://www.3gpp.org/ftp/Information/WORK_PLAN/Description Releases/Rel-12_description_20131224.zip. These techniques may also be used in enhanced MBMS (eMBMS), described in Enhanced MBMS Operation, 3GPP TR 26.848 v. 12.0.0 (December 2014), available at www.3gpp.org/ftp/Specs/archive/26_series/26.848/26848-c00.zip, and/or MBMS Protocols and Codecs, 3GPP TS 26.346 v. 12.4.0 (December 2014), available at www.3gpp.org/ftp/Specs/archive/26_series/26.346/26346-c40.zip.

The techniques of this disclosure may be used according to the following example use case of MI-EMO: Two major soccer teams of a populated city are to play a derby match against each other over the weekend. Since the game is expected to generate a lot of interest among the fans, the operator plans to offer the service over MBMS to its subscribers. The operator plans on delivering separate sets of targeted ads to the club fans, i.e., to be played back during the game breaks, etc., toward promoting the products from the fan stores of each soccer club, sharing club related news, etc.

The techniques of this disclosure may support targeted advertisement insertion in MBMS and eMBMS. The techniques of this disclosure may be used to broadcast main content and advertisements, and enable insertion of targeted advertisements with the support of a download client element (e.g., a software element, a hardware element, or a combination of hardware and software). For live events (that is, live-captured media content that is streamed as quickly as possible after capture, encoding, and packetization), the techniques of this disclosure may allow for scheduling delivery of targeted advertisements such that the advertisements can be inserted into the main content in real-time. The techniques of this disclosure may also allow for an MBMS client to selectively receive advertisements delivered through MBMS according to user traits. Such user traits may correspond to information stored in a User Preference/Profile data repository, e.g., stored in a client device.

The techniques of this disclosure may be applied when the following restrictions are in place: Targeted advertisement content delivery over MBMS may only be possible by sending all advertisement-related resources over the same File Delivery over Unidirectional Transport (FLUTE) session on the same Temporary Mobile Group Identity (TMGI). Then reception may be done with a promiscuous approach as defined in section 7.2 of TS 26.346 due to a possible inability to associate advertisement content with a specific group identified by specific user traits. TS 26.346 is described in 3rd Generation Partnership Project; Technical Specification Group Services and System Aspects; Multimedia Broadcast/Multicast Service (MBMS); Protocols and Codecs (Release 12); V12.0.0; December 2013, available at http://www.3gpp.org/DynaReport/26234.htm. Likewise, the techniques of this disclosure may be used when the following additional or alternative restrictions are in place: It may not possible to allow MBMS clients to selectively receive advertisement content delivered through MBMS according to user traits, in order to enable a one-copy operation to instruct FLUTE to receive a copy of one or more specific files (identified by the fileURI or potentially other patterns).

The techniques of this disclosure may also be applied to provide targeted advertisement insertion for Real-time Transport Protocol (RTP) streaming delivery over MBMS.

In general, this disclosure describes three example techniques for supporting targeted advertisement insertion. A first example technique is directed to application-based advertisement selection. A second example technique is directed to server-based advertisement selection, e.g., including a dynamic adaptive streaming over HTTP (DASH) client. In a third example technique, an MBMS Client assists in advertisement selection. Additional details of these example techniques, and species, combinations, and subcombinations thereof, are described in greater detail below.

In some examples, when receiving media content using broadcast or multicast, an MBMS client or eMBMS client may receive the media content, then make the media content available to a streaming client, such as a DASH client. The DASH client may retrieve the media content from the MBMS client using, e.g., HTTP retrieval operations. In HTTP streaming, such as DASH, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 (which may implement the techniques of this disclosure) may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

In a first example technique of this disclosure (application-based advertisement selection), retrieval unit 52 (or another element of client device 40, such as a client application of a DASH client, which may form part of retrieval unit 52) may perform targeted advertisement selection, without assistance from the DASH client or from an MBMS service layer. In this example, the intelligence for selecting advertisements resides at or is the responsibility of this application, which may involve interaction with other service enablers not specified by an applicable standard, such as 3GPP TS 26.346 (Multimedia Broadcast/Multicast Service (MBMS), Protocols and codecs). This example may enable different HTTP-based delivery techniques, e.g., the use of caching and/or cookies. In this example, the MBMS service layer may simply provide advertisement delivery. The DASH client may simply fetch an MPD as instructed by the application. This example may be modeled after the advertisement insertion framework devised by DASH-IF (DASH Industry Forum). Further details of this first example technique are described with respect to FIG. 4 below.

In a second example set of techniques of this disclosure (server-based advertisement selection, including the DASH client), retrieval unit 52 may include a DASH client that performs targeted advertisement selection, with assistance from devices of network 74 (e.g., server device 60, content preparation device 20, or another device not shown in FIG. 1). In general, network 74 includes a device that employs a DASH event mechanism to trigger the DASH client of retrieval unit 52 to fetch an updated MPD, which contains metadata to affect an advertisement determination. Both nominal and enhanced modes can be employed, as to whether an MBMS client of retrieval unit 52 downloads all advertisements, or only selected advertisements. This technique may be modeled after an advertisement insertion framework devised by DASH-IF. Various aspects of the techniques according to this second example are described with respect to FIGS. 5-8B.

Although the DASH event mechanism for updating the MPD has been described for purposes of example, it should be understood that the use of the DASH event mechanism is not mandatory to enable the delivery/acquisition of an updated MPD (where the updated MPD contains a remote Period element that describes the advertisement (ad) Segments to be fetched during the insertion/splice point in the program). An equivalent function could also be provided by signaling periodic expected MPD updates (signaled by MPD@minimumUpdatePeriod), at a high enough frequency, such that the DASH client, by keeping checking for MPD updates, will not miss the dynamic occurrence of the Ad break. An example of the use of such a minimum update period is described with respect to the method of FIGS. 15A-15B below.

In a third example technique (MBMS client assisted advertisement selection), an MBMS client of retrieval unit 52 performs advertisement selection based on processing of metadata contained in a User Service Description (USD). Advertisement selection intelligence and control may be assumed to reside solely in the MBMS client of retrieval unit 52, in this example. The MBMS client may selectively download and pre-cache advertisements, in advance of streaming program delivery. This example represents a content personalization mechanism that is not restricted to DASH as an application service. Thus, this third example technique may be equally applicable to, and operate in a common manner for, Real-Time Transport Protocol (RTP)-based streaming service delivery. Various aspects of the techniques according to this third example are described with respect to FIGS. 9-11B.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium 34, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
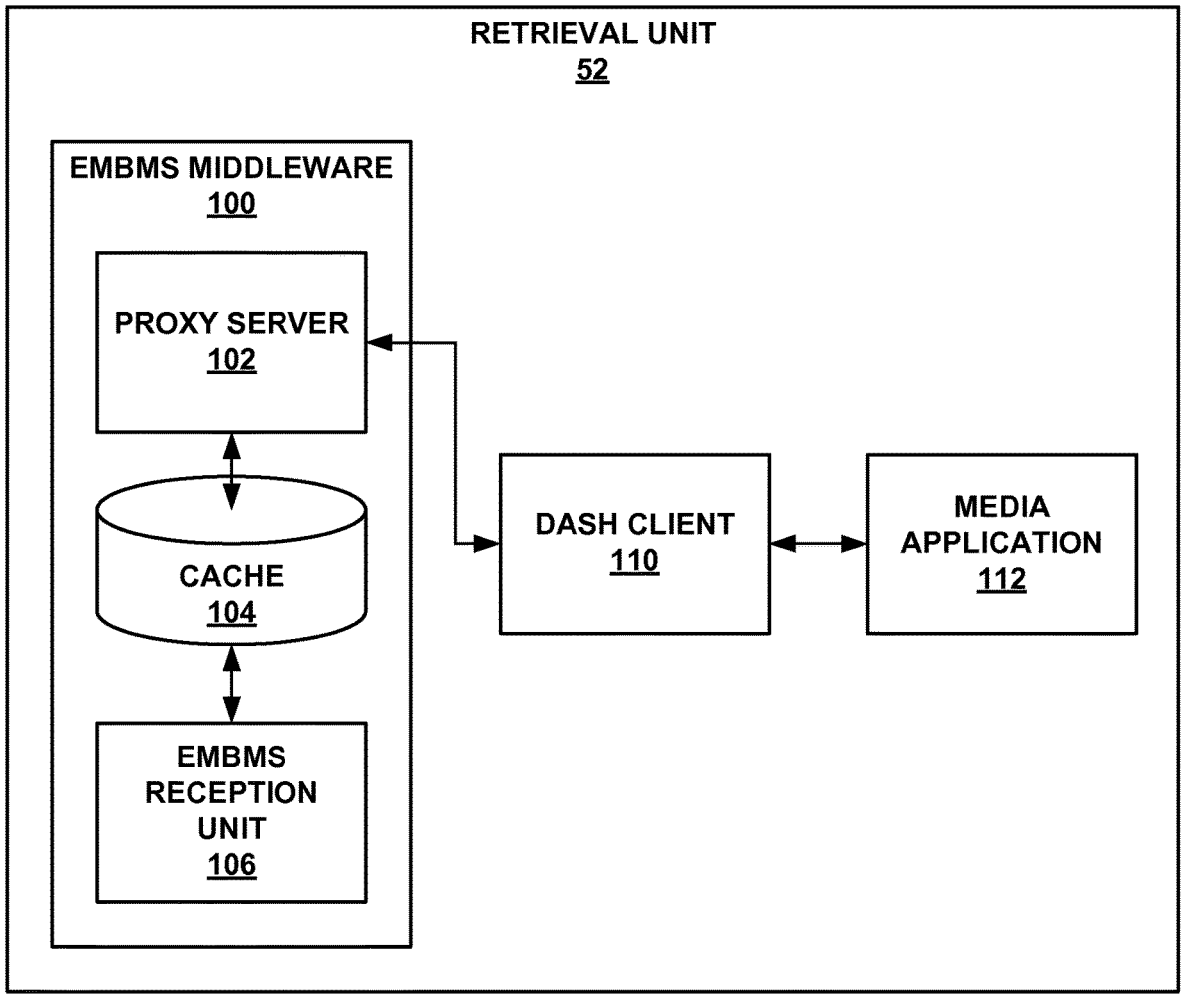
FIG. 2 is a block diagram illustrating an example set of components of the retrieval unit of FIG. 1 in greater detail.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

eMBMS middleware unit 100 further includes eMBMS reception unit 106, cache 104, and proxy server 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a BM-SC.

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Proxy server 102 may act as a proxy server for DASH client 110. For example, proxy server 102 may provide a MPD file or other manifest file to DASH client 110. Proxy server 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server 102. Proxy server 102 may retrieve requested data from cache 104 and provide the data to DASH client 110 in response to such requests.

After receiving a segment, DASH client 110 may pass data of the segment to media application 112, whether the segment is fully or partially received. DASH client 110 may process the segment, e.g., to extract media data from the segment and/or to discard data that is unusable by media application 112.

In accordance with the techniques of this disclosure, as explained in greater detail below, eMBMS middleware unit 100 may receive one or more advertisement groups and provide data for one of the advertisement groups to DASH client 110. For example, DASH client 110 may identify one of the advertisement groups or may provide data for a user to eMBMS middleware unit 100 such that eMBMS middleware unit 100 can select one of the advertisement groups.

Figure 3:
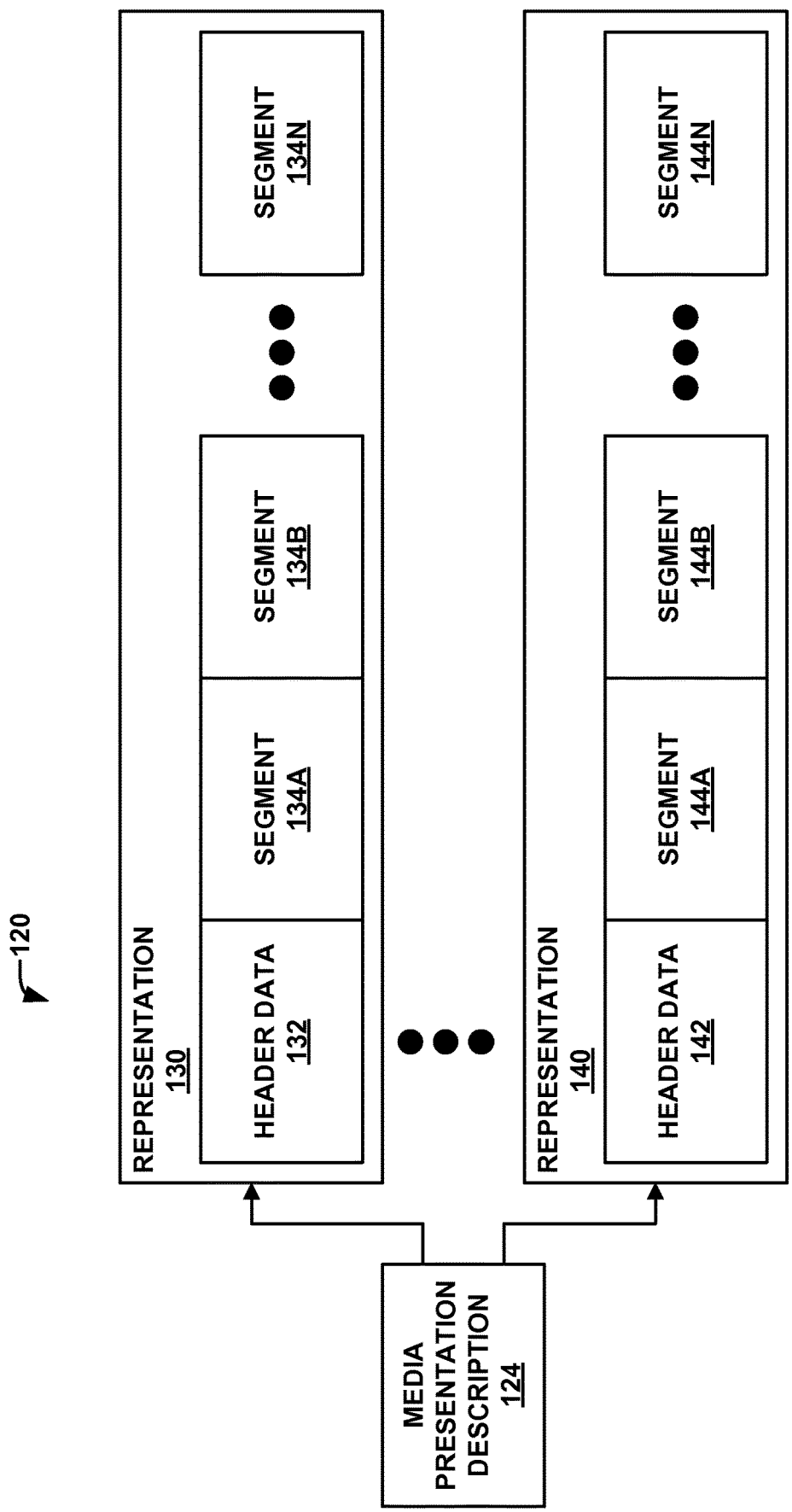
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 124 and a plurality of representations 130-140. Representation 130 includes optional header data 132 and segments 134A-134N (segments 134), while representation 140 includes optional header data 142 and segments 144A-144N (segments 144). The letter N is used to designate the last movie fragment in each of representations 130, 140 as a matter of convenience. In some examples, there may be different numbers of movie fragments between representations 130, 140.

MPD 124 may comprise a data structure separate from representations 130-140. MPD 124 may correspond to manifest file 66 of FIG. 1. Likewise, representations 130-140 may correspond to representations 68 of FIG. 1. In general, MPD 124 may include data that generally describes characteristics of representations 130-140, such as coding and rendering characteristics, adaptation sets, a profile to which MPD 124 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 132, when present, may describe characteristics of segments 134, e.g., temporal locations of random access points (RAPS, also referred to as stream access points (SAPs)), which of segments 134 includes random access points, byte offsets to random access points within segments 134, uniform resource locators (URLs) of segments 134, or other aspects of segments 134. Header data 142, when present, may describe similar characteristics for segments 144. Additionally or alternatively, such characteristics may be fully included within MPD 124.

Segments 134, 144 include one or more coded video samples, each of which may include frames or slices of video data. Each of the coded video samples of segments 134 may have similar characteristics, e.g., height, width, and bandwidth requirements. Such characteristics may be described by data of MPD 124, though such data is not illustrated in the example of FIG. 3. MPD 124 may include characteristics as described by the 3GPP Specification, with the addition of any or all of the signaled information described in this disclosure.

Each of segments 134, 144 may be associated with a unique uniform resource locator (URL). Thus, each of segments 134, 144 may be independently retrievable using a streaming network protocol, such as DASH. In this manner, a destination device, such as client device 40, may use an HTTP GET request to retrieve segments 134 or 124. In some examples, client device 40 may use HTTP partial GET requests to retrieve specific byte ranges of segments 134 or 124.

Figure 4:
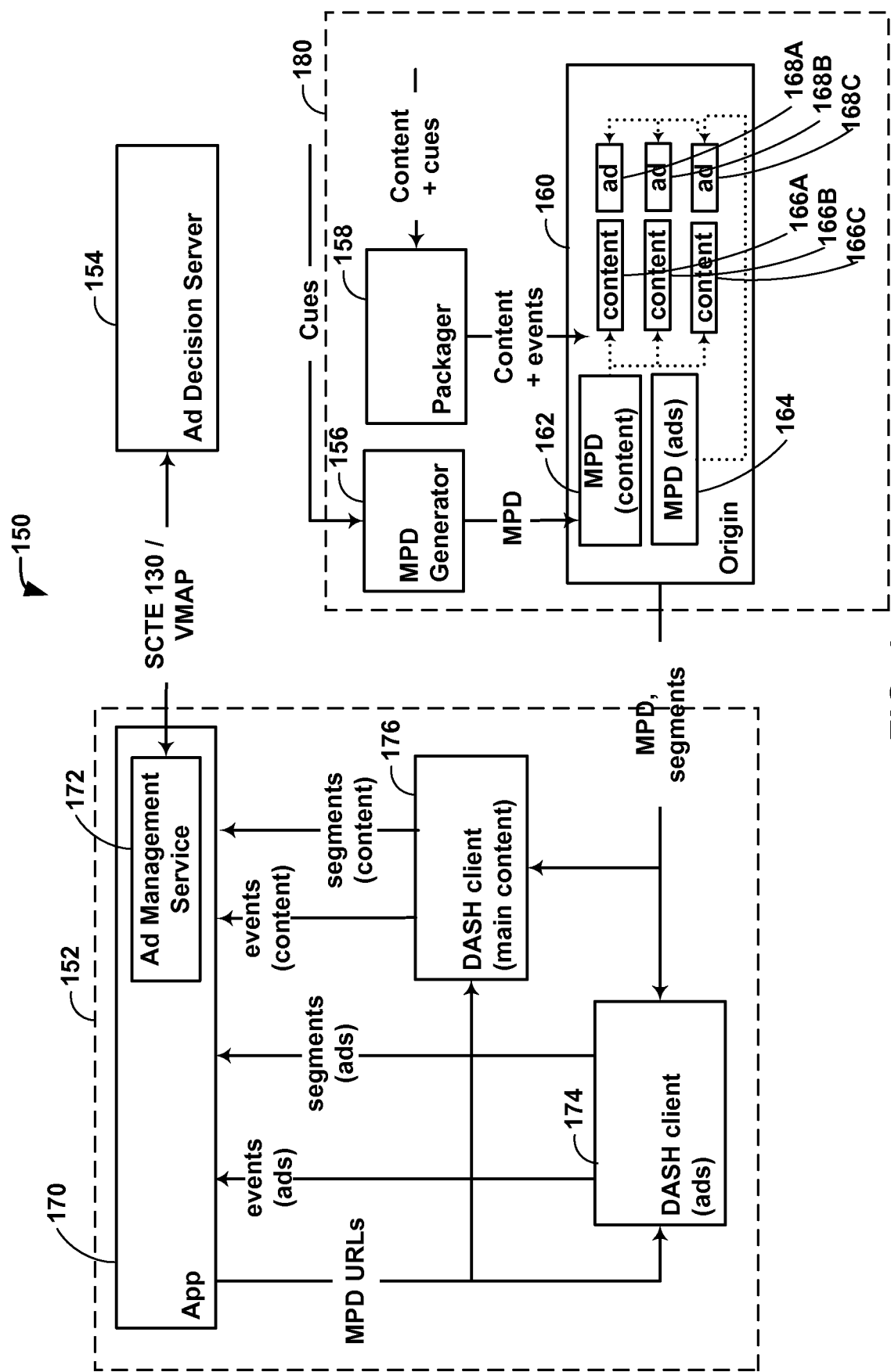
FIG. 4 is a block diagram illustrating another example system that may implement the techniques of this disclosure.

FIG. 4 is a block diagram illustrating another example system 150 that may implement the techniques of this disclosure. The elements of system 150 in FIG. 4 may generally correspond to elements of FIG. 1. For instance, system 150 includes advertisement (ad) decision server 154, content distribution system 180, and client device 152. The elements of content distribution system 180 may generally correspond to content preparation device 20 and/or server device 60 of FIG. 1, while the elements of client device 152 may correspond to client device 40 of FIG. 1. In some examples, the elements of client device 152 may correspond to retrieval unit 52 of FIG. 1.

In this example, content distribution system 180 includes MPD generator 156, packager 158, and origin server 160. MPD generator 156 generates an MPD 162 for main media content (e.g., media data for a program which a user desires to watch) as well as one or more MPDs for advertisements, such as MPD 164. MPD 162 describes media content 166A-166C, while MPD 164 describes advertisement data 168A-168C. Packager 158 assembles media content 166A-166C and advertisement data 168A-168C. Packager 158 may generally correspond to encapsulation unit 30 (FIG. 1).

Client device 152 includes media application 170, which itself includes advertisement management service 172. Client device 152 also includes DASH client 176 for retrieving main media content and DASH client 174 for retrieving advertisement data. Application 170 retrieves MPD URLs from ad decision server 154 via advertisement management service 172 and provides the MPD URLs to DASH client 176 and DASH client 174. Either or both of DASH client 174 and DASH client 176 may correspond to DASH client 110 of FIG. 2. Advertisement management service 172 may select the MPD(s) for advertisements in accordance with the techniques of this disclosure, as discussed in greater detail below. DASH client 174 may use the MPD(s) for advertisements to retrieve advertisement data (e.g., one or more of advertisement data 168A-168C) from origin server 160. DASH client 176 may retrieve main content (e.g., one or more of main content 166A-166C) from origin server 160.

In accordance with the first example technique of this disclosure, application specific events may be passed to application 170, which interacts with external ad decision server 154 to provide DASH client 174 with an MPD URL that points to ad content, e.g., advertisement data 168A-168C. Application 170 pauses the main program while ad content is acquired and played out. After ad insertion, application 170 resumes playout of the main program.

Ad management service 172 may employ user profile/preference ("UP/P") information, content consumption history, an ad recommendation engine, etc. (alone or in any combination), to support targeted ad insertion. General web technologies may be used for this purpose. Additionally or alternatively, other methods, such as VMAP (Video Multiple Ad Playlist) defined by IAB (Interactive Advertising Bureau) may also be used.

In this example, an MBMS service layer (not shown) provides a strictly delivery function for DASH clients 174, 176. For instance, the MBMS service layer may deliver and makes available ad content data designated for target user groups or profiles, where each category may be mapped to a unique URL. The MBMS client may download and cache all broadcast ads for selective request by DASH client 176 on behalf of application 170.

Application 170, DASH clients 174, 176, MPD generator 156, and packager 158 may be implemented in hardware or software. When implemented in software, it is presumed that requisite hardware, such as one or more processing units and one or more computer-readable storage media, are also provided. The computer-readable storage media may store instructions for the software, and the processing units may execute the instructions to perform the functionality described above.

Figure 5:
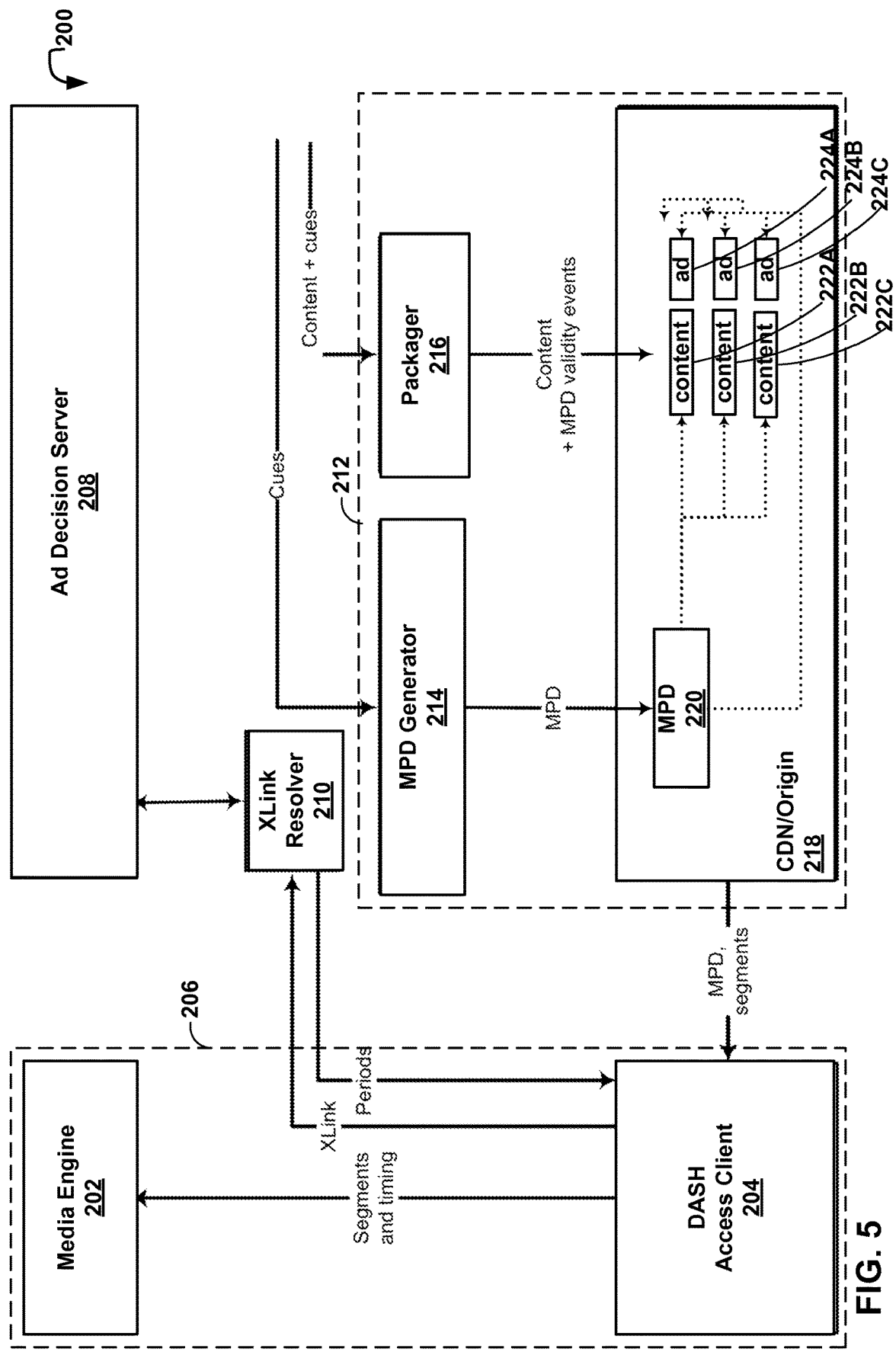
FIG. 5 is a block diagram illustrating another example system that may implement the techniques of this disclosure.

FIG. 5 is a block diagram illustrating another example system 200 that may implement the techniques of this disclosure. The elements of system 200 in FIG. 5 may generally correspond to elements of FIG. 1. For instance, system 200 includes advertisement (ad) decision server 208, content distribution system 212, and client device 206. The elements of content distribution system 212 may generally correspond to content preparation device 20 and/or server device 60 of FIG. 1, while the elements of client device 206 may correspond to client device 40 of FIG. 1. In some examples, the elements of client device 206 may correspond to retrieval unit 52 of FIG. 1.

In this example, client device 206 includes media engine 202 and DASH access client 204. DASH access client 204 may correspond to DASH client 110 of FIG. 2, while media engine 202 may correspond to media application 112 of FIG. 2. Content distribution system 212 includes MPD generator 214, packager 216, and content distribution network (CDN)/Origin server 218. Origin server 218 stores MPD 220, main content 222A-222C, and advertisement data 224A-224C.

The example of FIG. 5 represents a possible implementation of the second example set of techniques of this disclosure. In this second example set of techniques, the basic concept is that DASH access client 204 and the HTTP stack are "responsible" for acquiring appropriate advertisements. A Remote Period described in MPD 220 may reference ad content (e.g., advertisement data 224A-224C), which may be targeted to a specific user group/profile, by proper formatting of Period@xlink:href. Thus, when DASH access client 204 directs an XLink (that is, XML Linking Language data) to XLink resolver 210, XLink resolver 210 retrieves data describing an appropriate remote Period from ad decision server 208. CDN/Origin server 218 may send MPD 220, containing the remote Period, in advance if advertisement break time is known at the time when MPD generator 214 generates MPD 220. Alternatively, CDN/Origin server 218 may send the remote Period data dynamically using a DASH-specific event to trigger DASH access client 204 to acquire updates to MPD 220.

The techniques for selecting advertisements may be similar to those described above with respect to FIG. 4. For example, UP/P information, content consumption history, an advertisement recommendation engine, or the like may be employed to support targeted advertisement insertion.

As noted above, the second example includes a set of techniques. That is, various options (used alone or in any combination) are possible. In a first option, the MBMS service layer (not shown) performs non-selective advertisement reception. The MBMS service layer may deliver and make available advertisement content designated for targeted user groups or profiles, where each category may be mapped to a unique URL. The MBMS client may download and cache all broadcast advertisements for selective request by DASH access client 204 and/or media engine 202.

In a second option, the MBMS service layer performs selective advertisement reception. A Broadcast Multicast Service Center (BM-SC) may attach metadata to each ad (e.g., advertisement data 224A-224C) and DASH access client 204 may inform the MBMS client of a preferred category of advertisement data to selectively download and cache, such that the MBMS client selectively downloads and caches the broadcast advertisements (e.g., one of advertisement data 224A-224C).

Media engine 202, DASH access client 204, MPD generator 214, and packager 216 may be implemented in hardware or software. When implemented in software, it is presumed that requisite hardware, such as one or more processing units and one or more computer-readable storage media, are also provided. The computer-readable storage media may store instructions for the software, and the processing units may execute the instructions to perform the functionality described above.

FIGS. 6A-8B are sequence diagrams illustrating various example methods in which a DASH client (e.g., DASH access client 204) ensures reception of appropriate advertisement content. The various methods of FIGS. 6A-8B are consistent with the second example set of techniques of this disclosure, described above with respect to FIG. 5.

In FIGS. 6A-8B, various elements are described as performing various tasks. These elements include an application (e.g., media engine 202), a DASH client (e.g., DASH access client 204), an MBMS client (which may include a local HTTP proxy and XLink resolver 210), a BM-SC (e.g., CDN/Origin server 218), an ad decision server (e.g., ad decision server 208), a content provider (e.g., including MPD generator 214 and packager 216), and an ad provider (not shown in FIG. 5).

Figure 6A:
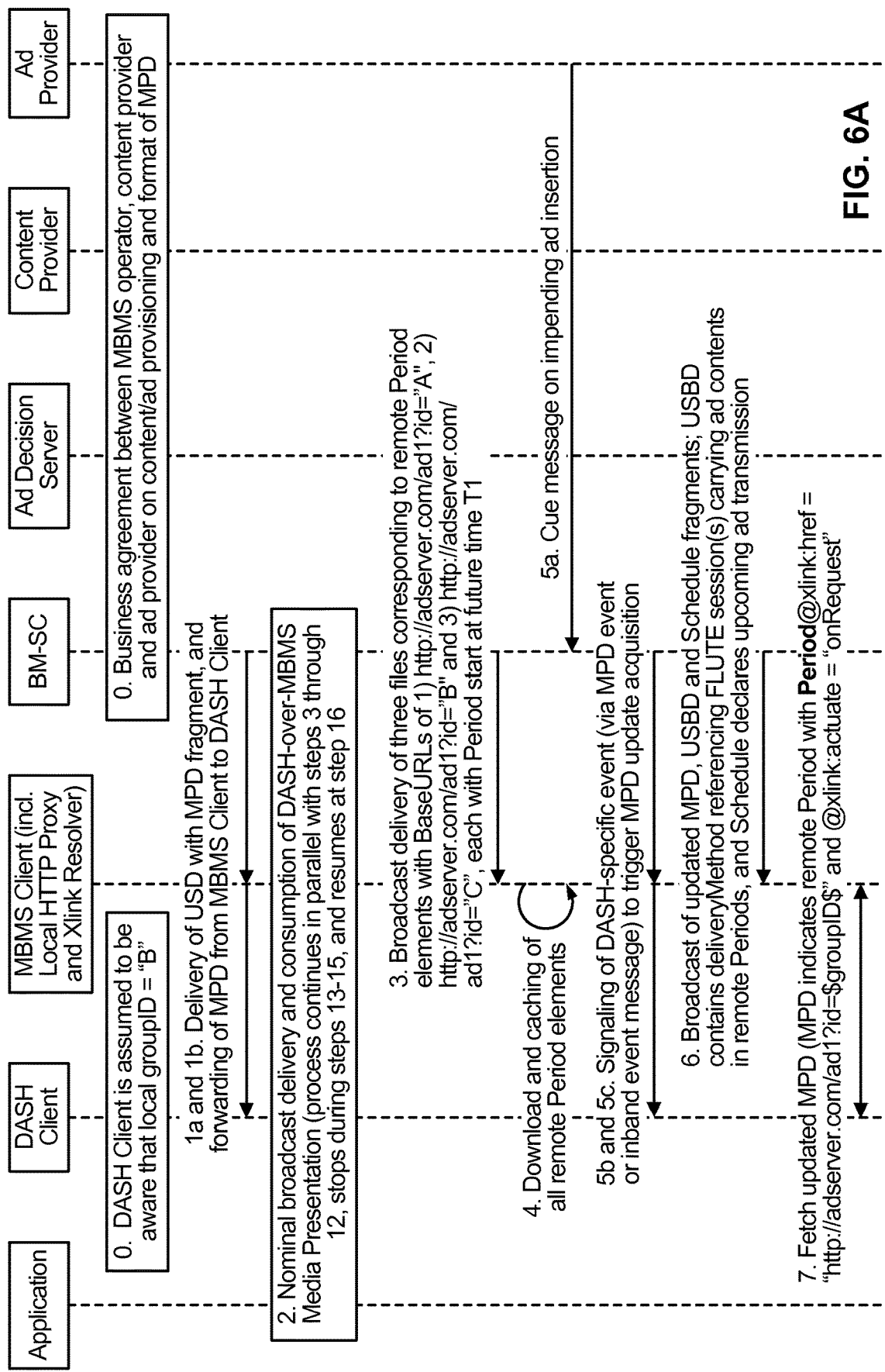
FIGS. 6A-8B are sequence diagrams illustrating various example methods in which a DASH client ensures reception of appropriate advertisement content.
Figure 6B:
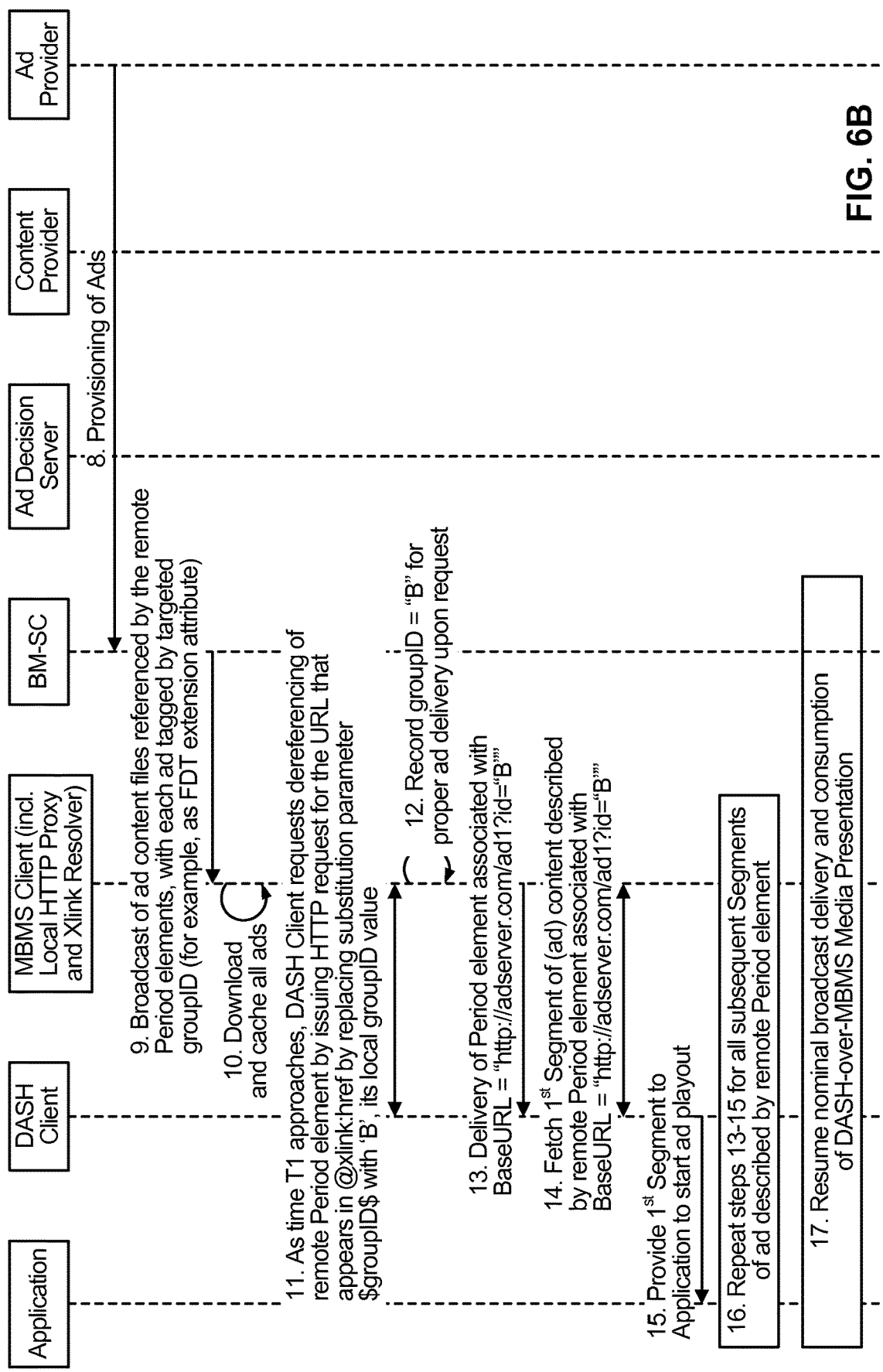

FIGS. 6A and 6B illustrate an example of a method in accordance with the first option described above for the second example set of techniques of this disclosure. Furthermore, the example of FIGS. 6A and 6B corresponds to a situation in which an advertisement break start time is unknown when the MPD is generated (e.g., for a live event). FIGS. 6A and 6B illustrates actions performed by various elements, including an application (e.g., media application 112 of FIG. 2), a DASH client (e.g., DASH client 110 of FIG. 2), an MBMS client (e.g., eMBMS middleware unit 100 of FIG. 2), a BM-SC, an ad decision server, a content provider, and an ad provider.

In the example of FIGS. 6A and 6B, the DASH client is assumed to be aware that a local groupID is equal to "B." There is also assumed to be a business agreement between the MBMS operator, the content provider, and the ad provider on content/ad provisioning and MPD format. Initially in the example of FIGS. 6A and 6B, the BM-SC delivers a USD with an MPD fragment to the MBMS client, which forwards the MPD to the DASH client. The BM-SC may then deliver, via broadcast, three files corresponding to remote Period elements with BaseURLs of, e.g., 1) http://adserver.com/ad1?id="A", 2) http://adserver.com/ad1?id="B", and 3) http://adserver.com/ad1?id="C," each with Period start time at future time T1. The MBMS client downloads and caches all remote Period elements.

At some time in the future, as result of receiving a cue message from the ad provider, indicating an impending ad insertion occurrence, the BM-SC signals a DASH-specific event (e.g., via an MPD event or an inband event message) to trigger acquisition of an updated MPD, which the MBMS client receives and forwards to the DASH client. The BM-SC then broadcasts the updated MPD, USBD, and Schedule fragments, where the USBD contains delivery-Method referencing FLUTE session(s) carrying ad contents in remote Periods, and the Schedule declares an upcoming ad transmission. In response, the DASH client fetches an updated MPD (where the MPD indicates a remote period with Period@xlink:href=http://adserver.com/ad1?id=$groupID$ and @xlink:actuate="onRequest," in this example. In this case, the DASH client does not attempt to dereference the link for the remote Period immediately, but defers such deferencing action until the play-time of the associated content is expected to enter that period.

Figure 13A:
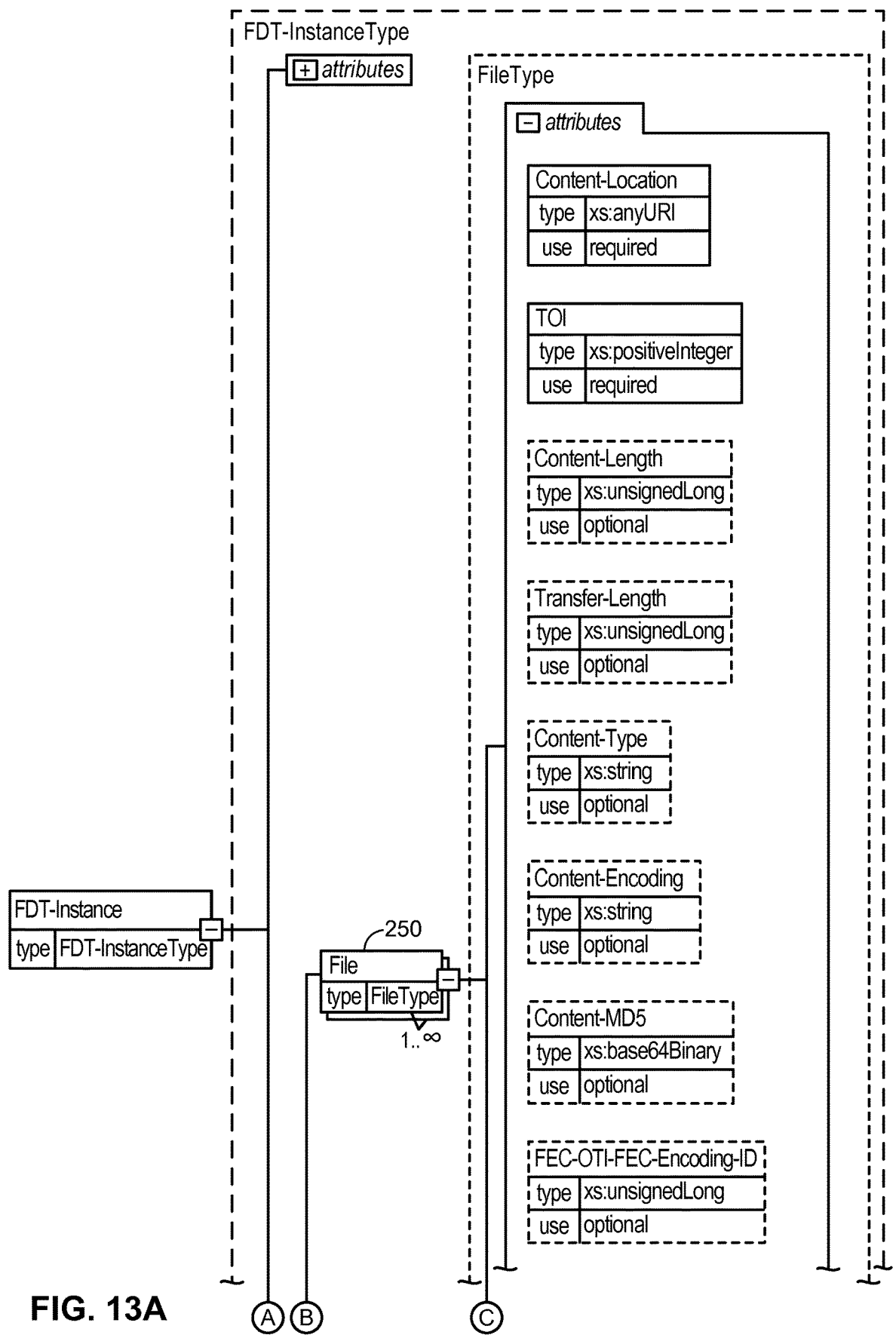
FIGS. 13A-13D are conceptual diagrams illustrating an example extension to a file delivery table (FDT) File element.
Figure 13B:
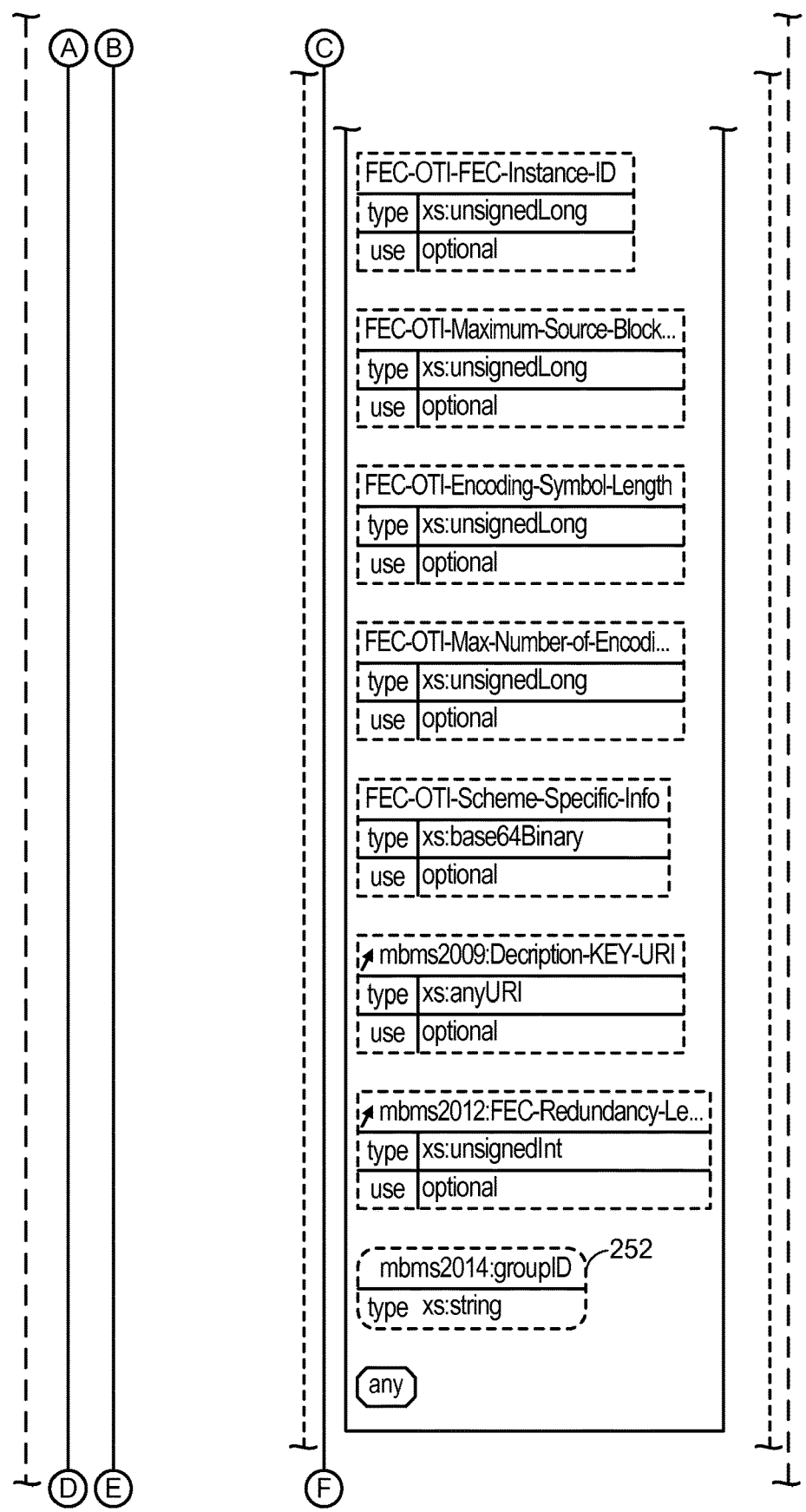
Figure 13C:
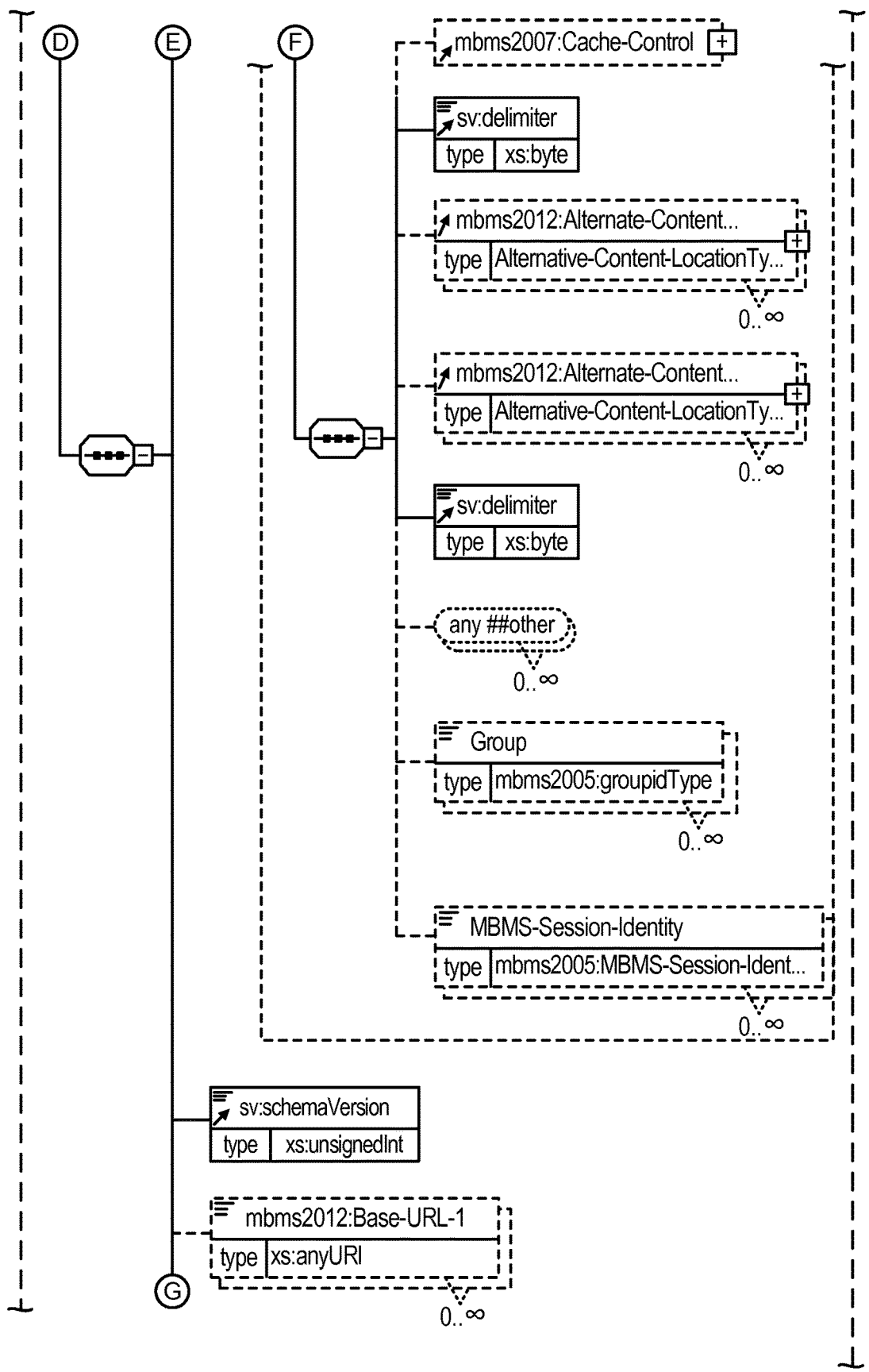
Figure 13D:
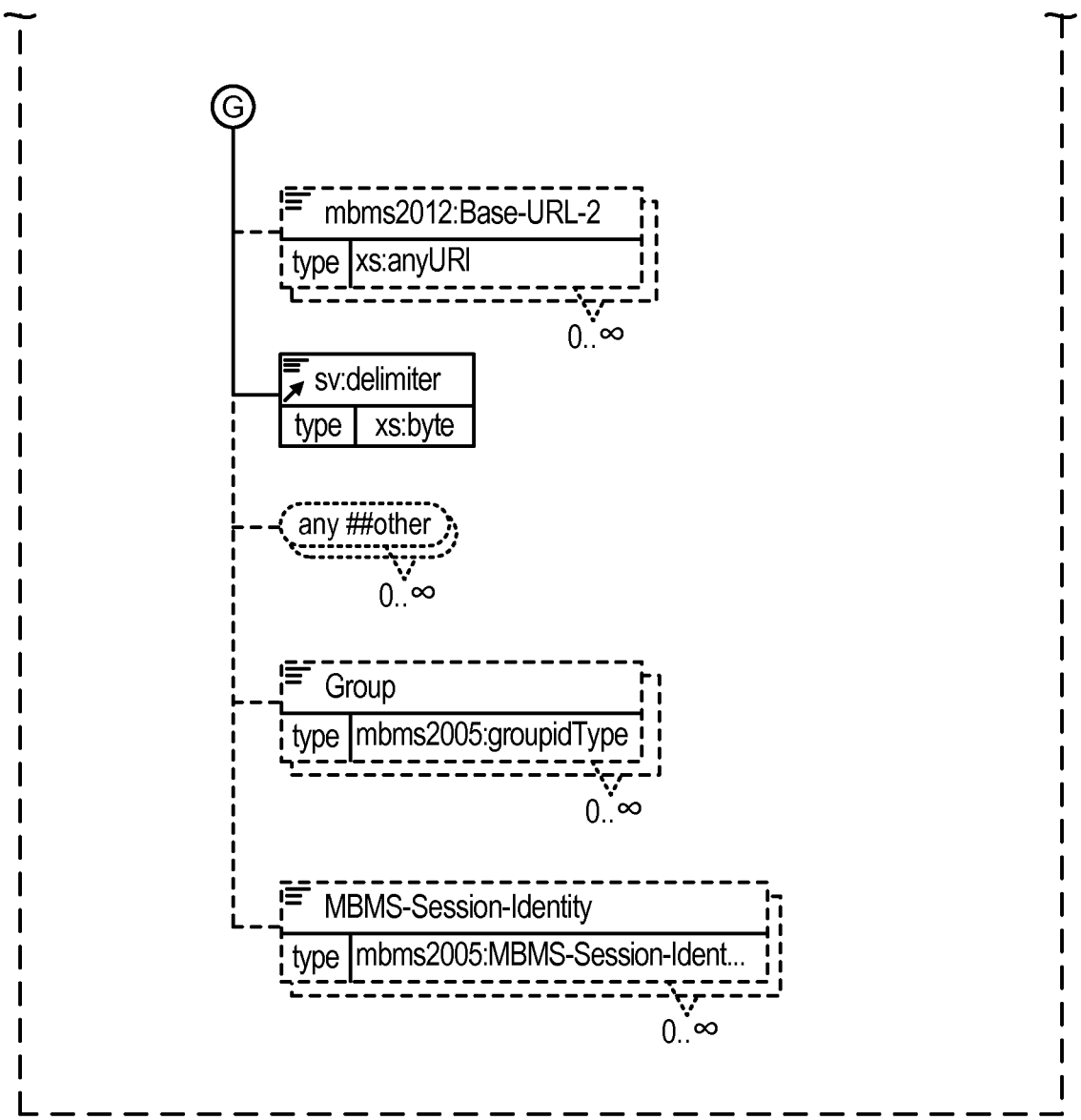

The BM-SC then broadcasts ad content files referenced by the remote Period elements, with each ad tagged by a targeted groupID (for example, as a file delivery table (FDT) 'File' element extension attribute "$groupID$", e.g., as discussed with respect to FIGS. 13A and 13B below). Additionally or alternatively, as discussed below, a groupIDFilter of a Filter Description fragment may identify the advertisement data. The MBMS client downloads and caches all of the ads, in this example. As time T1 approaches, the DASH client requests dereferencing of remote Period elements by issuing an HTTP request for the URL that appears in @xlink:href and provides to the MBMS client a local groupID value of "B." In response the MBMS client records groupID="B" for proper ad delivery upon request, and delivers the Period associated with BaseURL="http://adserver.com/ad1?id="B"" to the DASH client. The DASH client then provides segments of this advertisement to the application. This process continues until the advertisement data has been fully played, and then normal broadcast of the main content may resume.

Figure 7A:
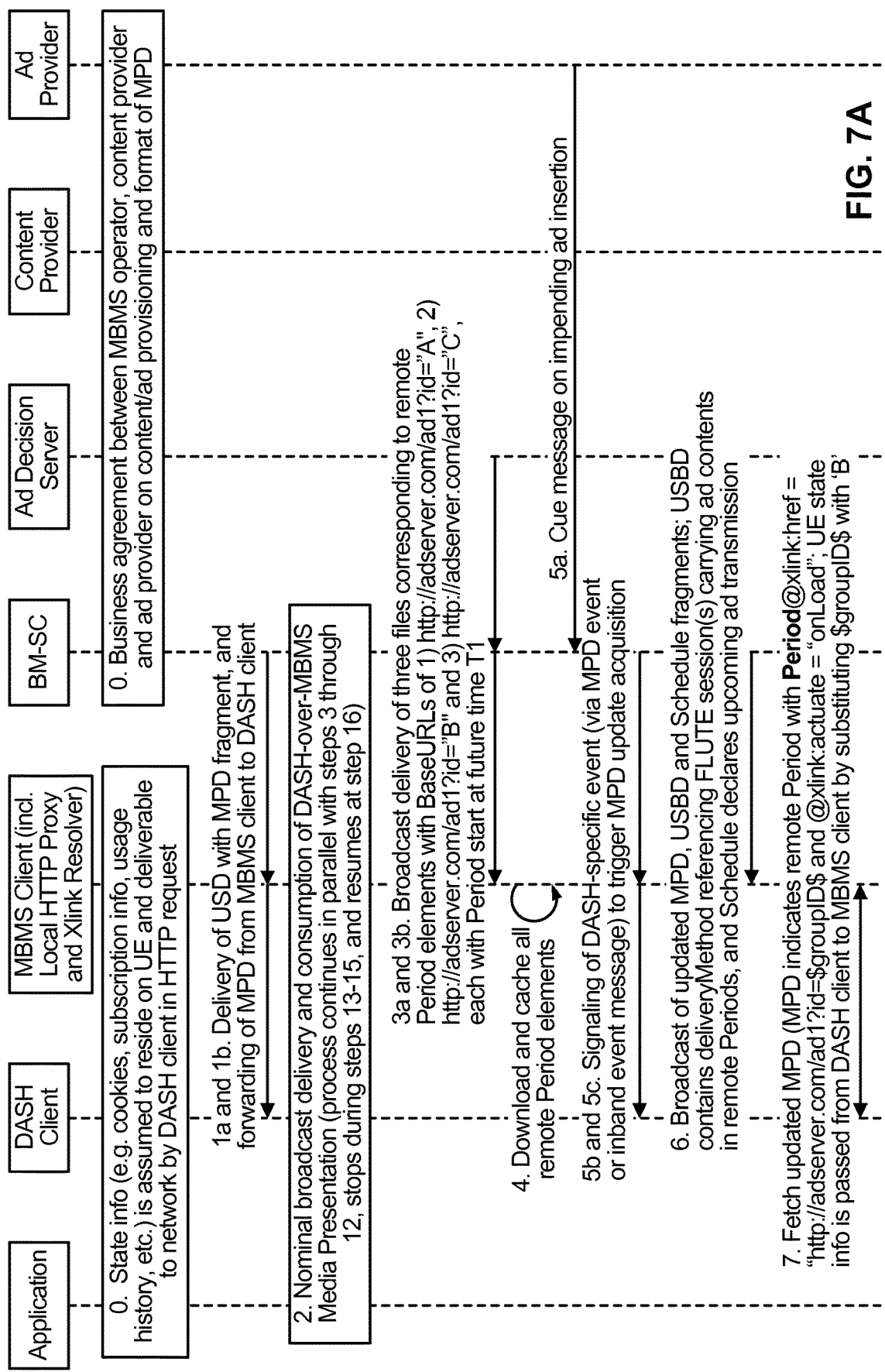
Figure 7B:
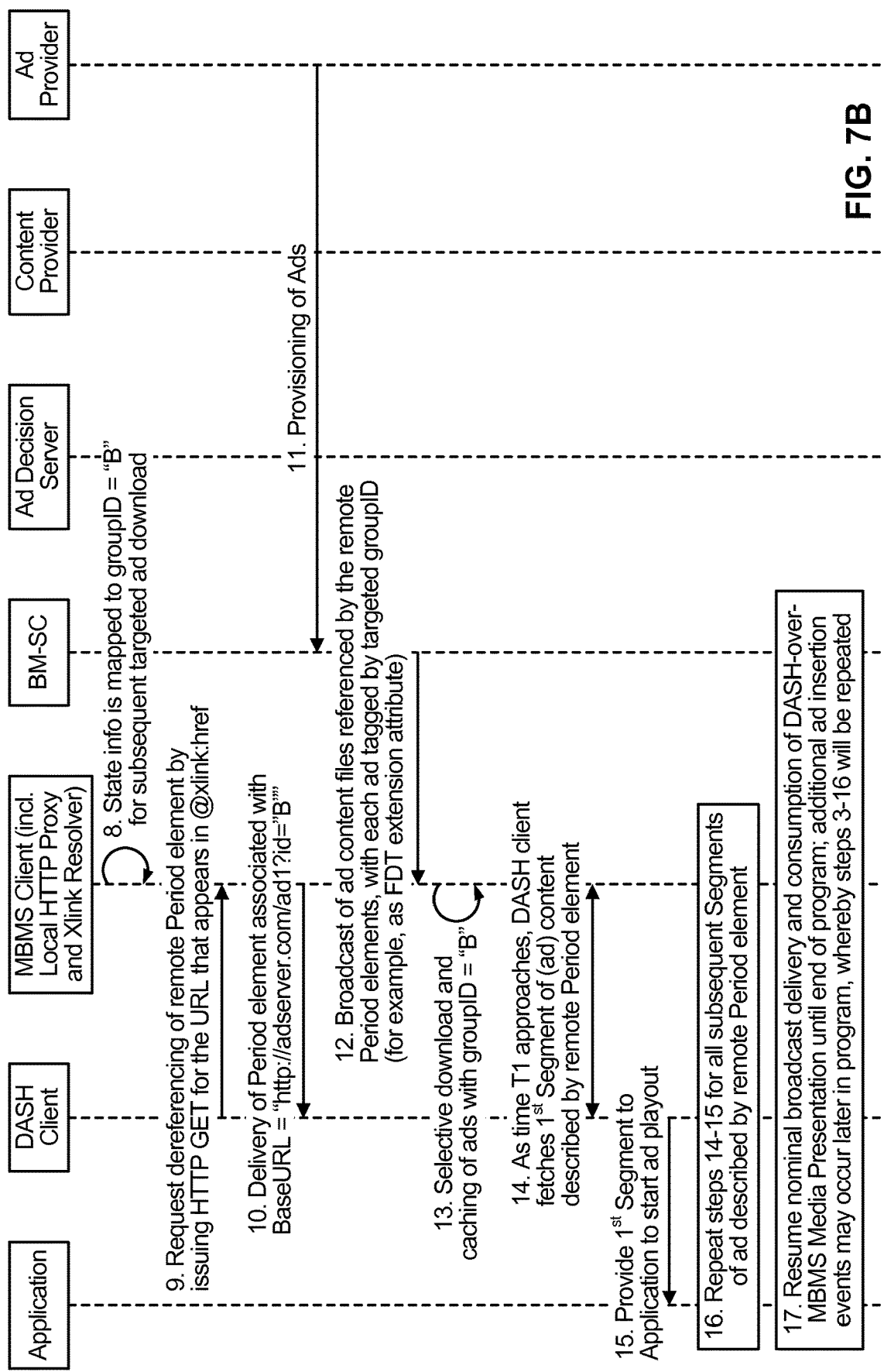

FIGS. 7A and 7B illustrate an example in which an advertisement availability (ad avail) time is unknown at the time when the MPD is generated (e.g., for a live event). The example of FIGS. 7A and 7B corresponds to option two as described above, where there is selective advertisement reception by the MBMS client. In this example, broadcast advertisement delivery occurs just before the ad avail time. FIGS. 7A and 7B illustrates actions performed by various elements, including an application (e.g., media application 112 of FIG. 2), a DASH client (e.g., DASH client 110 of FIG. 2), an MBMS client (e.g., eMBMS middleware unit 100 of FIG. 2), a BM-SC, an ad decision server, a content provider, and an ad provider.

In the example of FIGS. 7A and 7B, state information (such as cookies, subscription information, usage history, and the like) is assumed to reside on user equipment (UE), and be deliverable to devices of the network by a DASH client in an HTTP request. Likewise, in this example, it is assumed that there is a business agreement between the MBMS operator, the content provider, and the ad provider on content/ad provisioning and format of the MPD.

Initially, the BM-SC delivers a USD with MPD fragment to the MBMS client, and the MBMS client forwards the MPD to the DASH client. The BM-SC may then deliver, via broadcast, three files corresponding to remote Period elements with BaseURLs of, e.g., 1) http://adserver.com/ad1?id="A", 2) http://adserver.com/ad1?id="B", and 3) http://adserver.com/ad1?id="C," each with Period start time at future time T1. The MBMS client downloads and caches all remote Period elements. At some time in the future, as result of receiving a cue message from the ad provider, indicating an impending ad insertion occurrence, the BM-SC signals a DASH-specific event (e.g., via an MPD event or an inband event message) to trigger acquisition of an updated MPD, which the MBMS client receives and forwards to the DASH client. The BM-SC then broadcasts the updated MPD, USBD, and Schedule fragments, where the USBD contains deliveryMethod referencing FLUTE session(s) carrying ad contents in remote Periods, and the Schedule declares an upcoming ad transmission.

In response, the DASH client fetches an updated MPD (where the MPD indicates a remote period with Period@xlink:href=http://adserver.com/ad1?id=$groupID$ and @xlink:actuate="onLoad". In this case, the DASH client will dereference the link for the remote Period immediately upon loading the MPD, and will pass the UE state information described above to the MBMS client which acts as the Xlink Resolver. The MBMS client then maps the state information to one of the advertisement groups for subsequent targeted ad download. In this example, it is assumed that the MBMS client maps the state information to groupID="B."

The DASH client then requests dereferencing of the remote Period element by issuing an HTTP GET for the URL that appears in @xlink:href. The MBMS client responds by delivering the Period element associated with BaseURL="http://adserver.com/ad1?id="B"" in this example. The BM-SC then broadcasts advertisement content files referenced by the remote Period elements, with each ad tagged by targeted groupID (for example, as an FDT extension attribute, such as that discussed with respect to FIGS. 13A and 13B below). Additionally or alternatively, as discussed below, a groupIDFilter of a Filter Description fragment may identify the advertisement data.

The MBMS may then selectively download and cache ads with groupID="B" in this example. As time T1 approaches, the DASH client requests dereferencing of remote Period elements by issuing an HTTP request for the URL that appears in @xlink:href and provides to the MBMS client a local groupID value of "B." In response the MBMS client records groupID="B" for proper ad delivery upon request, and delivers the Period associated with BaseURL="http://adserver.com/ad1?id="B"" to the DASH client. The DASH client then provides segments of this advertisement to the application. This process continues until the advertisement data has been fully played, and then normal broadcast of the main content may resume.

Figure 8A:
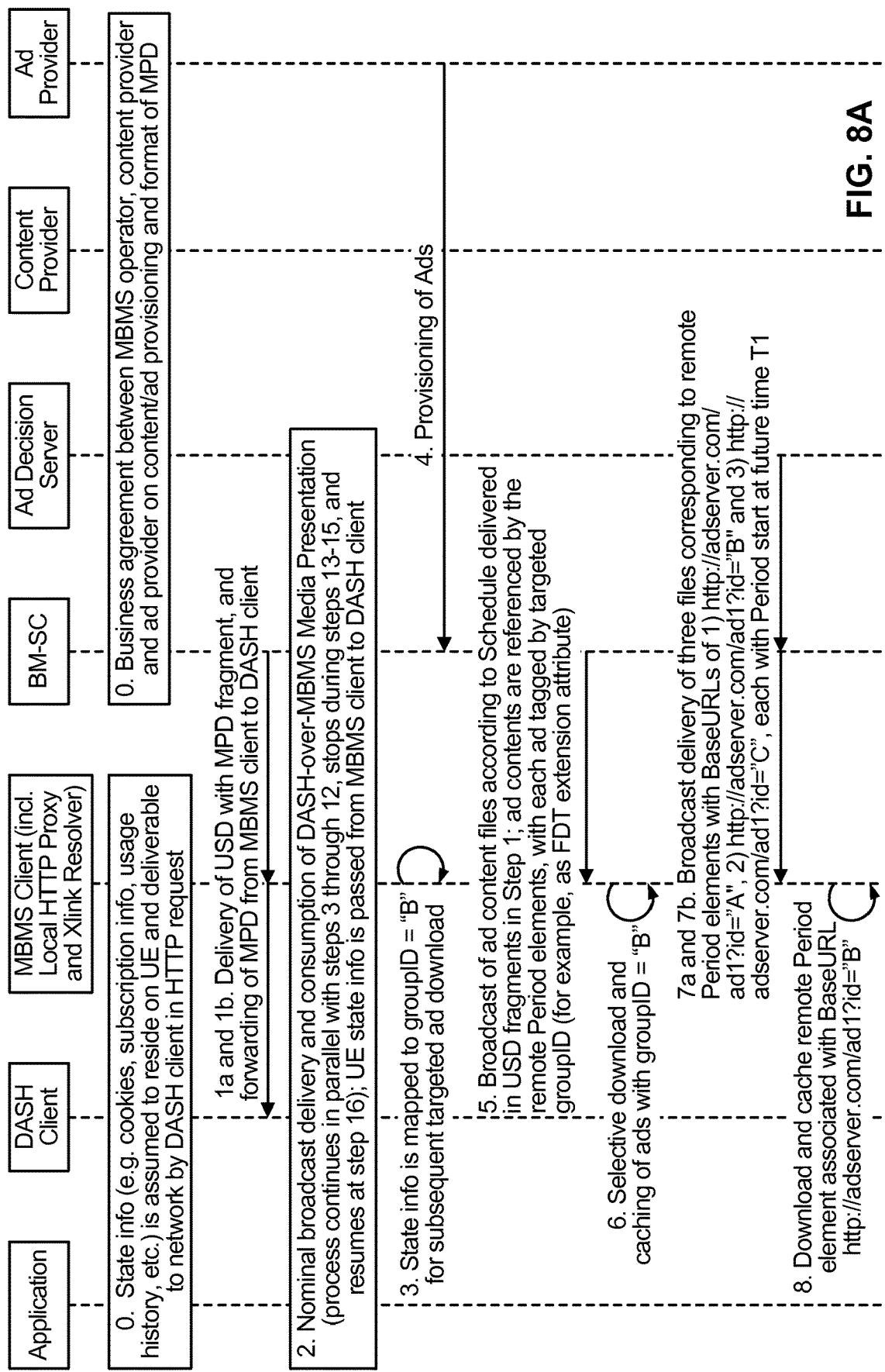
Figure 8B:
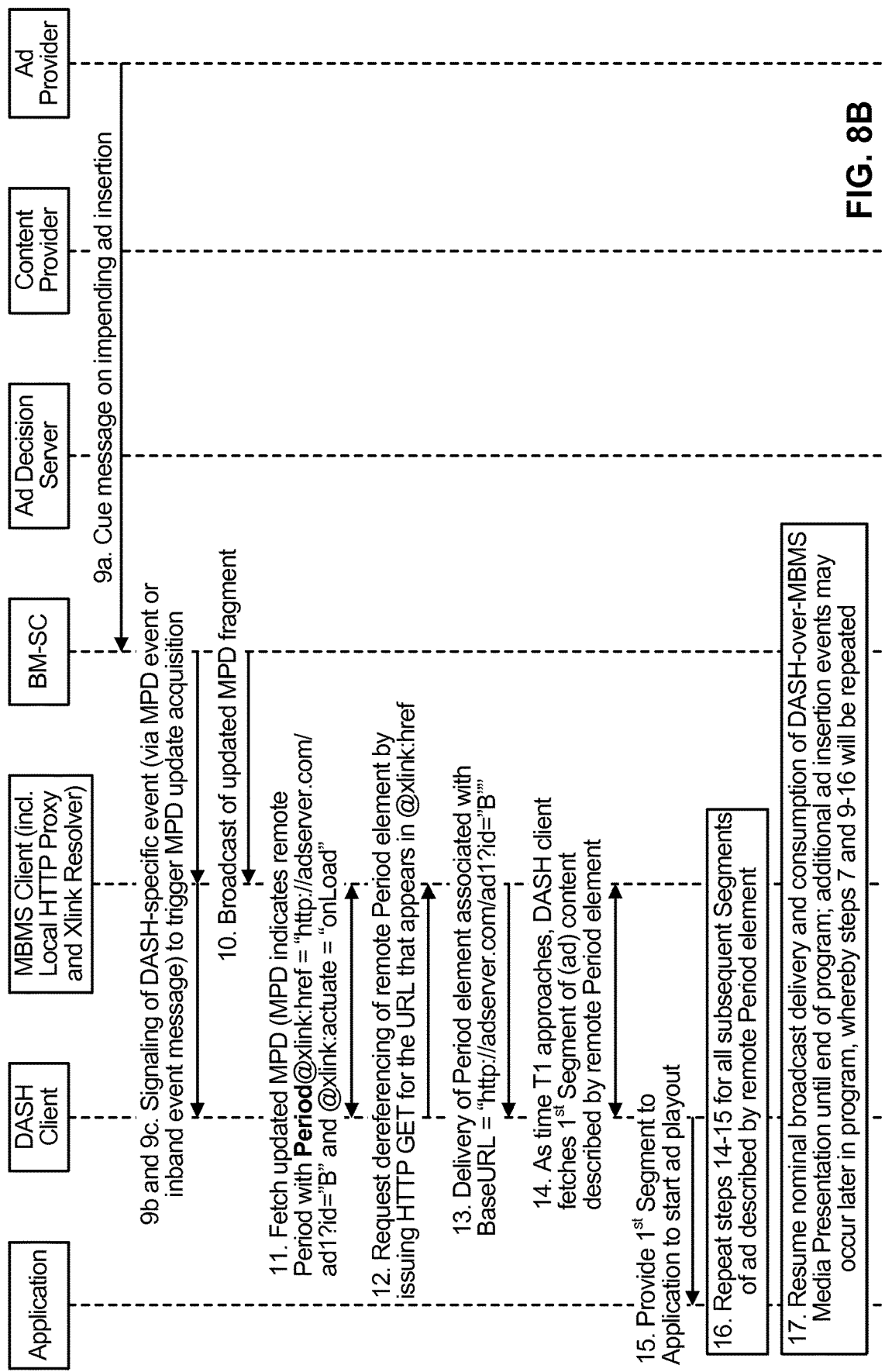

FIGS. 8A and 8B illustrate an example in which an advertisement availability (ad avail) time is unknown at the time when the MPD is generated (e.g., for a live event). The example of FIGS. 7A and 7B corresponds to option two as described above, where the ad is broadcast just before there is selective advertisement reception by the MBMS client. In this example of FIGS. 8A and 8B, broadcast advertisement delivery occurs well before the ad avail time, and is selectively cached until it is time to play the advertisement. FIGS. 8A and 8B illustrate actions performed by various elements, including an application (e.g., media application 112 of FIG. 2), a DASH client (e.g., DASH client 110 of FIG. 2), an MBMS client (e.g., eMBMS middleware unit 100 of FIG. 2), a BM-SC, an ad decision server, a content provider, and an ad provider.

In the example of FIGS. 8A and 8B, state information (such as cookies, subscription information, usage history, and the like) is assumed to reside on user equipment (UE). In contrast to the example of FIGS. 7A and 7B, the DASH client passes the state information to the MBMS client during the initial HTTP request for DASH content. Similar to the example of FIGS. 7A and 7B, it is assumed that there is a business agreement between the MBMS operator, the content provider, and the ad provider on content/ad provisioning and format of the MPD.

Therefore, in this example, the MBMS client can map state information for the client device (UE) to a groupID, e.g., groupID="B," early on, for subsequent targeted advertisement download. The BM-SC may then broadcast advertisement content files according to the Schedule delivered in the USD fragments, which may occur well before an initial ad avail becomes possible. Advertisement contents are referenced by the remote Period elements, with each advertisement tagged by a target groupID (for example, as FDT extension attribute, such as that discussed with respect to FIGS. 13A and 13B below). Additionally or alternatively, as discussed below, a groupIDFilter of a Filter Description fragment may identify the advertisement data. The MBMS client then selectively downloads and caches ads with groupID="B" in this example.

Next, the BM-SC delivers a USD with MPD fragment to the MBMS client, and the MBMS client forwards the MPD to the DASH client. The BM-SC may then deliver, via broadcast, three files corresponding to remote Period elements with BaseURLs of, e.g., 1) http://adserver.com/ad1?id="A", 2) http://adserver.com/ad1?id="B", and 3) http://adserver.com/ad1?id="C," each with Period start time at future time T1. Because the MBMS client has already determined the groupID value associated with the user (in this example, groupID="B"), it can download and cache the remote Period element associated with BaseURL http://adserver.com/ad1?id="B". At some time in the future, as result of receiving a cue message from the ad provider, indicating an impending ad insertion occurrence, the BM-SC signals a DASH-specific event (e.g., via an MPD event or an inband event message) to trigger acquisition of an updated MPD, which the MBMS client receives and forwards to the DASH client. The BM-SC then broadcasts an updated MPD fragment, which the MBMS client receives.

The DASH client then fetches an updated MPD (where the MPD indicates a remote period with Period@xlink:href=http://adserver.com/ad1?id=B and @xlink:actuate="onLoad". In this case, the DASH client will dereference the link for the remote Period. Likewise, in this example, the DASH client need not substitute a value for a parameter in the Xlink URL, because the MPD itself specifies a value for the advertisement group (B, in this example). The MBMS client responds by delivering the Period element associated with BaseURL="http://adserver.com/ad1?id="B"" in this example. That is, the MBMS client will only have cached the data associated with advertisement group "B" in this example, as discussed above.

As time T1 approaches, the DASH client requests and receives from the MBMS client, the first Segment of the content, i.e., the targeted advertisement, associated with the previously received Period element. The DASH client then provides the media content of this Segment of the advertisement to the application. This process continues until the advertisement data has been fully played, and then normal broadcast of the main content may resume.

FIGS. 6A-8B represent only some of the possible examples in accordance with the techniques of this disclosure. Other call flow variations for the server-based method are possible as well. For example, in the case of broadcast ad delivery occurring well before ad avail, the value of Period@xlink:actuate carried in the MPD update could be set to "onRequest" (instead of "onLoad"). Because targeted ad(s) have already been selectively downloaded and cache on the UE, there is no time urgency to resolve the xlink, as long as it occurs before the ad avail. If for some reason, no targeted ads are available on the device upon the occurrence of the ad avail, a default pre-stored ad could be played out in its place.

There are also different possible mechanisms by which the MBMS client derives the proper "groupID" value from UE state info provided by the DASH client. As one example, there may be access to UE-resident enablers such as a local UP/P database, content recommendation engine, or performing inference using locally-stored usage history log. As another example, there may be access to network-side enablers such as an external UP/P database, or content recommendation engine.

The third example of the techniques of this disclosure, which is directed to MBMS client assisted advertisement selection, is described with respect to FIGS. 9-11B. The basic concept of the third example is that the MBMS client selectively downloads and caches broadcast ads based on ad metadata and/or filter rules contained in USD. The Filter Description fragment may be extended to carry ad filtering data. This example presumes the availability of enablers such as UP/P info, content consumption history, etc. to the MBMS client. For example, the enablers may include device-resident UP/P info that is accessible to MBMS client. Specific UP/P data and interactions are not described, but could be determined by those skilled in the art.

Furthermore, the MBMS service layer provides an ad filtering/selection function. Broadcast ads are assumed to be delivered prior to the program (e.g., DASH Media Presentation) for selective download and caching by the MBMS client. Ad selection mechanism by MBMS client may be implementation-specific.

Figure 9:
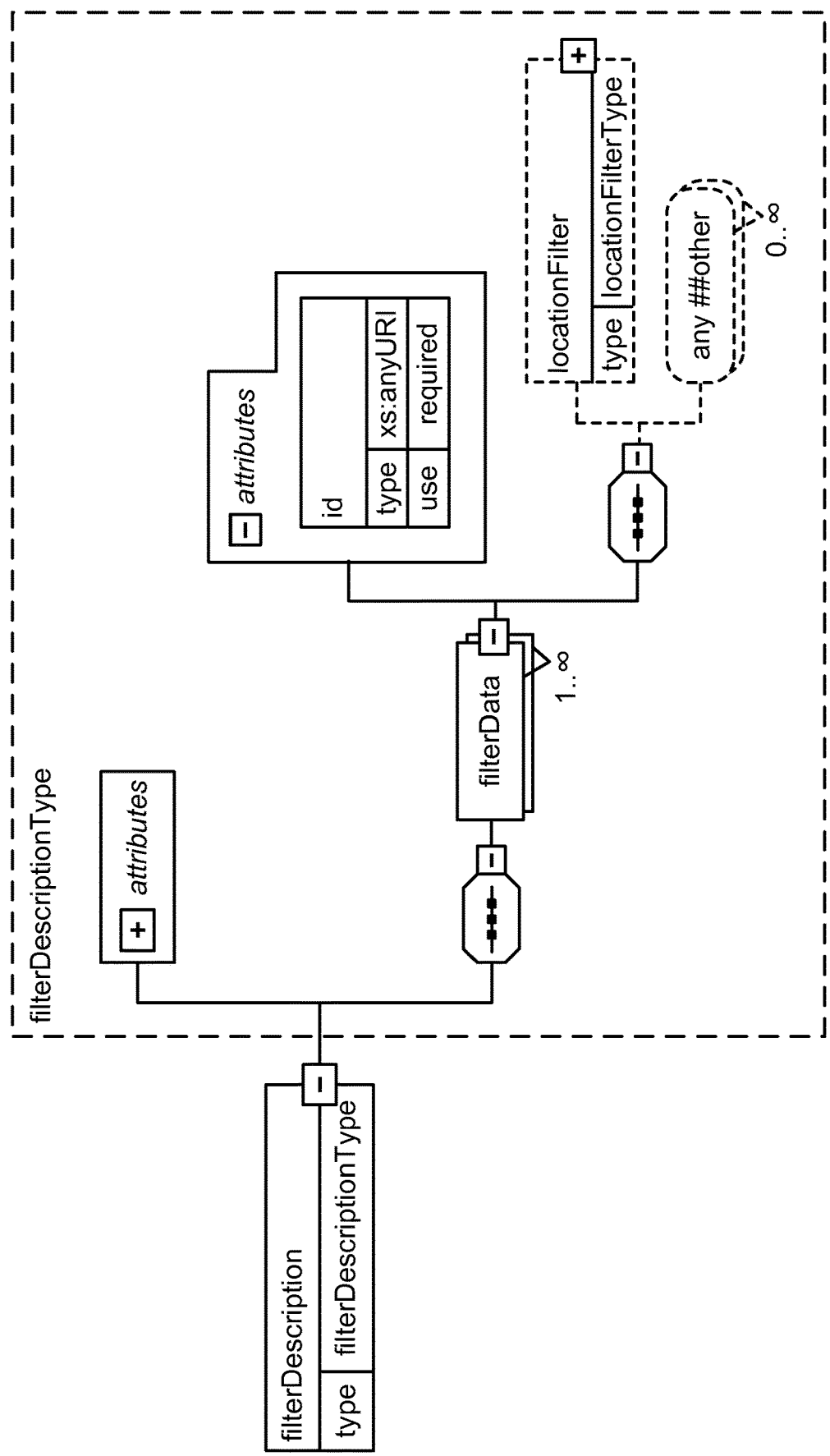
FIG. 9 is a conceptual diagram illustrating an example Filter Description fragment, as currently defined, to carry location filter data.
Figure 10:
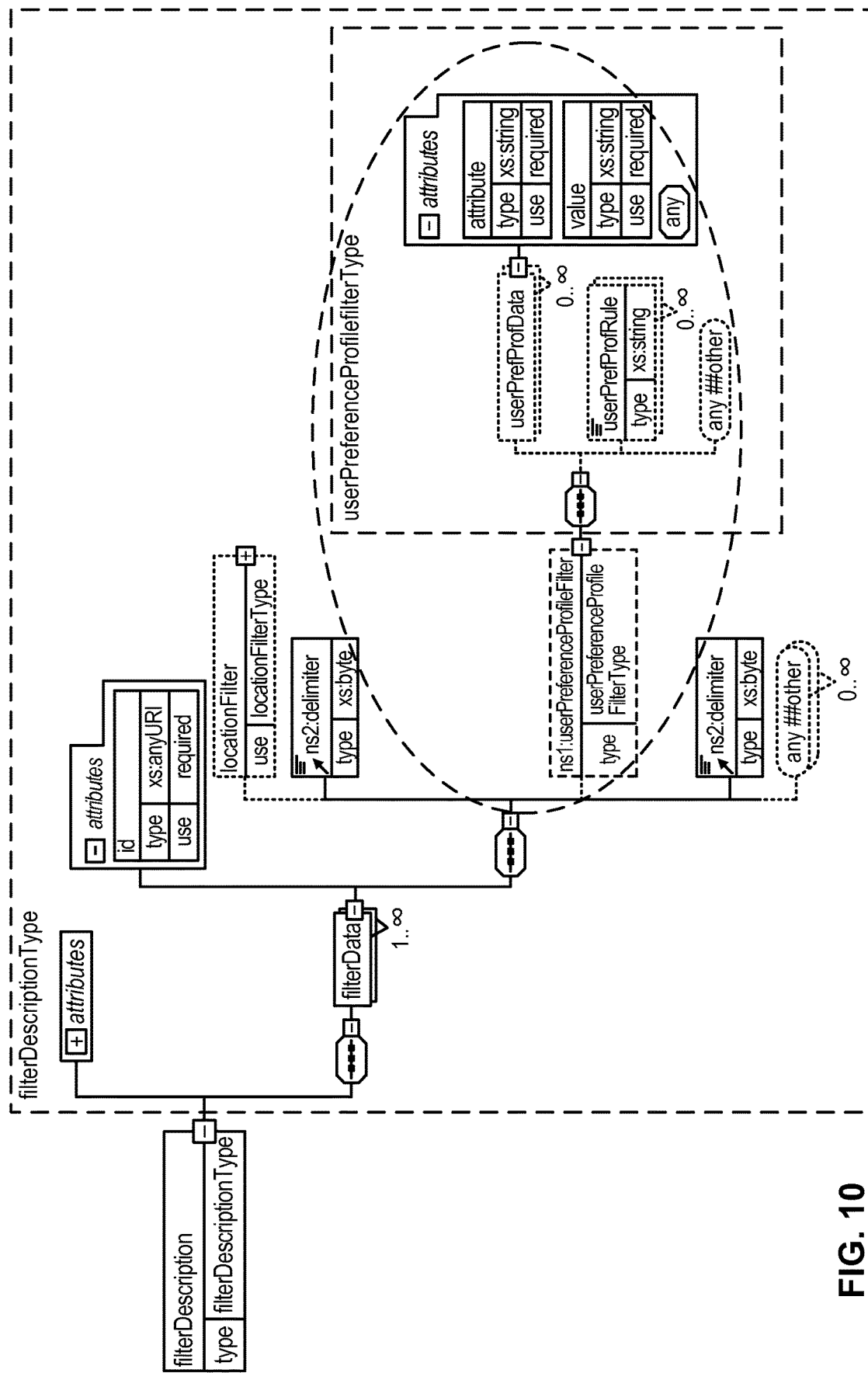
FIG. 10 is a conceptual diagram illustrating extensions to the Filter Description fragment to carry User Preference & Profile (UP/P) data.

FIG. 9 is a conceptual diagram illustrating an example Filter Description fragment, as currently defined, to carry location filter data. FIG. 10 is a conceptual diagram illustrating extensions to the Filter Description fragment to carry User Preference & Profile (UP/P) data. In the example of FIG. 10, the userPrefProfData element contains attribute-value pairs (e.g., user demographics, content category, rating, popularity, etc.) for ad selection. The userPrefProfRule element contains a filtering rule (specific conditions and logic) for ad selection.

Figure 11A:
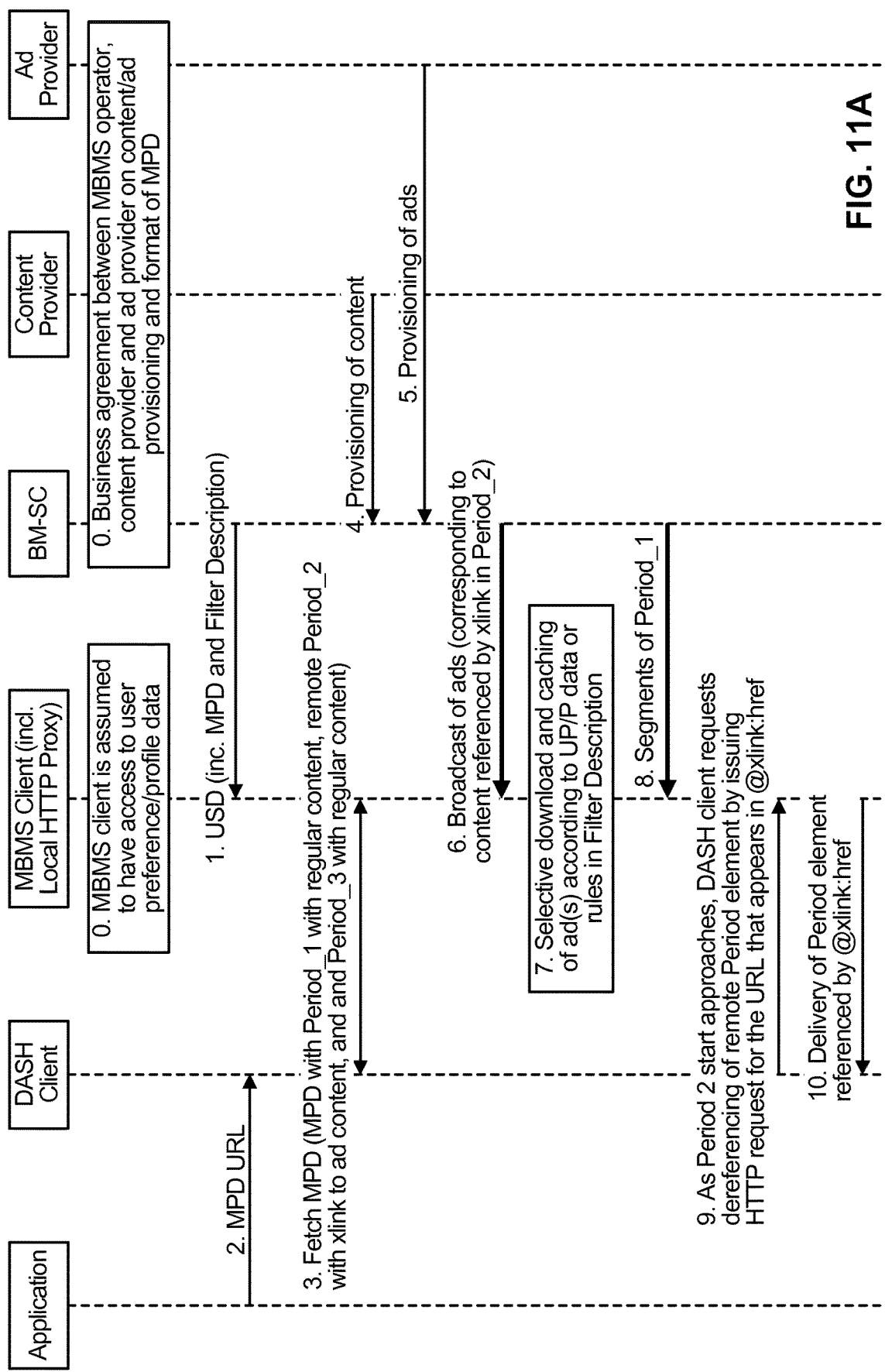
FIGS. 11A and 11B are sequence diagrams illustrating an example method for MBMS client assisted ad selection in accordance with the techniques of this disclosure.
Figure 11B:
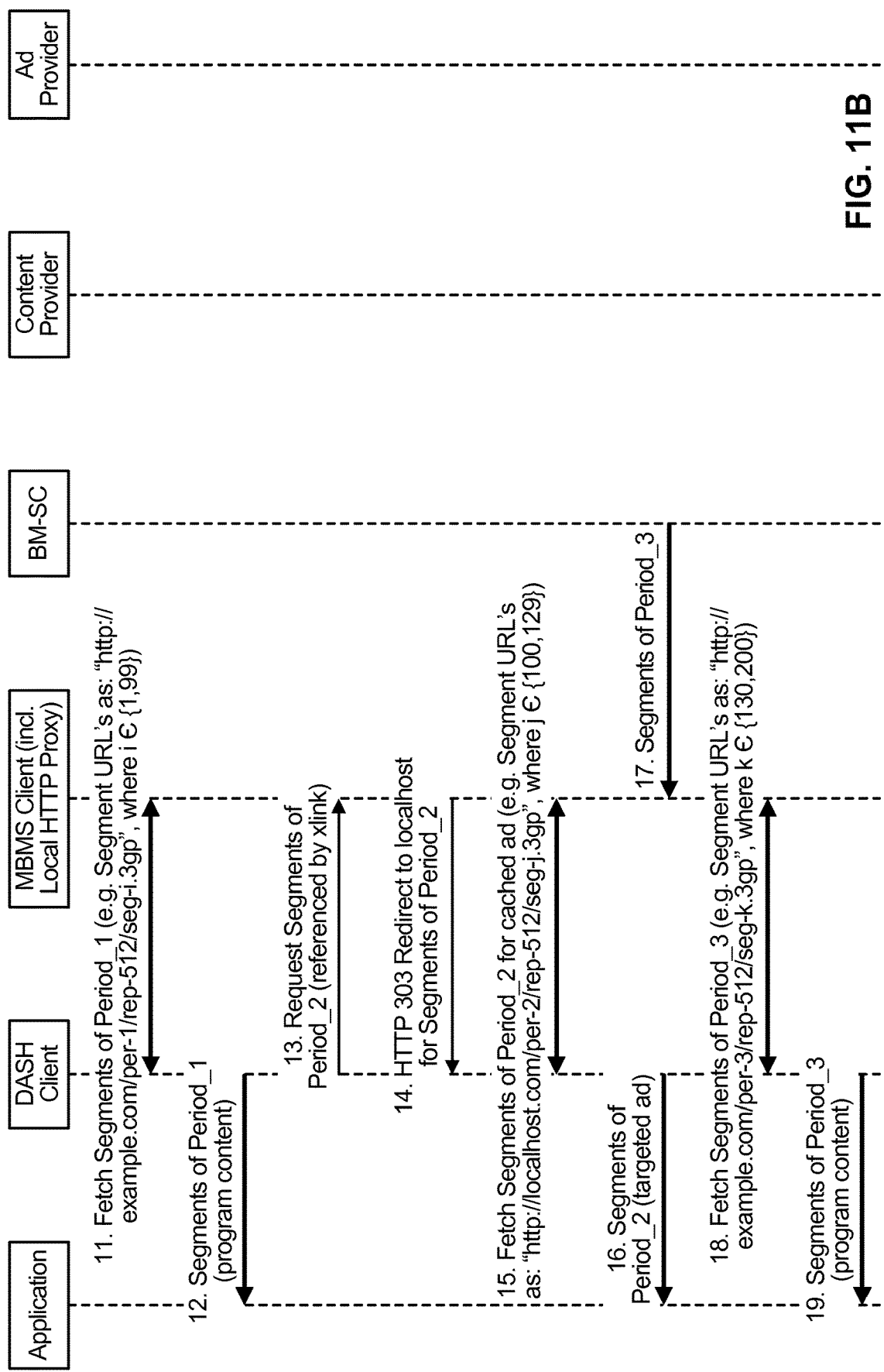

FIGS. 11A and 11B are sequence diagrams illustrating an example method for MBMS client assisted ad selection in accordance with the techniques of this disclosure. In this example, an ad break start time is known at the time the MPD is generated. The active units of FIGS. 11A and 11B are substantially similar to those of FIGS. 6A-8B. FIGS. 11A and 11B illustrates actions performed by various elements, including an application (e.g., media application 112 of FIG. 2), a DASH client (e.g., DASH client 110 of FIG. 2), an MBMS client (e.g., eMBMS middleware unit 100 of FIG. 2), a BM-SC, an ad decision server, a content provider, and an ad provider.

It is assumed, in the example of FIGS. 11A and 11B, that the MBMS client has access to UP/P data, and that there is a business agreement between the MBMS operator, the content provider, and the ad provider on content/ad provisioning and MPD format. Initially, the BM-SC provides a USD, which includes an MPD and a Filter Description, e.g., according to the example of FIG. 10. The application sends an MPD URL to the DASH client, which then fetches the MPD from the URL. The MPD is assumed to include Period_1 for regular content, remote Period_2 with an XLink to ad content, with attribute xlink:actuate="onRequest", and Period_3 with more regular content. That is, in this example, Period_2 represents a predetermined advertisement break. The content provider provides the regular (or main) content to the BM-SC, and the ad provider provides the advertisement content to the BM-SC.

The BM-SC broadcasts ads (corresponding to content referenced by the XLink in Period_2) to the MBMS client. The MBMS client selectively downloads and caches ads according to, e.g., the UP/P data or rules of the Filter Description. The BM-SC then broadcasts segments of Period_1 to the MBMS client. As the start of Period_2 approaches, the DASH client requests dereferencing of the remote period element (corresponding to Period_2, in this example) by issuing an HTTP request for the URL that appears in @xlink:href. The MBMS client then delivers the Period element (corresponding to Period_2) referenced by the @xlink:href. The DASH client fetches Segments of Period_1 (e.g. Segment URL's as: "http://example.com/per-1/rep-512/seg-j.3gp", where i∈{1,99}).

The DASH client then sends the segments of Period_1 (the program content) to the application. The DASH client also requests segment of Period_2 (referenced by the xlink) from the MBMS client. The MBMS client redirects the DASH client to a localhost address using, e.g., an HTTP 303 response, in order to retrieve segments of Period_2 from a local cache. The DASH client then fetches Segments of Period_2 for cached ad content (e.g. Segment URL's as: "http://localhost.com/per-2/rep-512/seg-j.3gp", where j∈{100,129}).

The DASH client then sends the segments of Period_2 (the advertisement content) to the application. The BM-SC also broadcasts segments of Period_3 to the MBMS client. The DASH client also requests segment of Period_3 from the MBMS client (e.g., Segment URL's as: "http://example.com/per-3/rep-512/seg-k.3gp", where k∈{130,200}). The DASH client then sends the segments of Period_3 (the program content) to the application.

Figure 12:
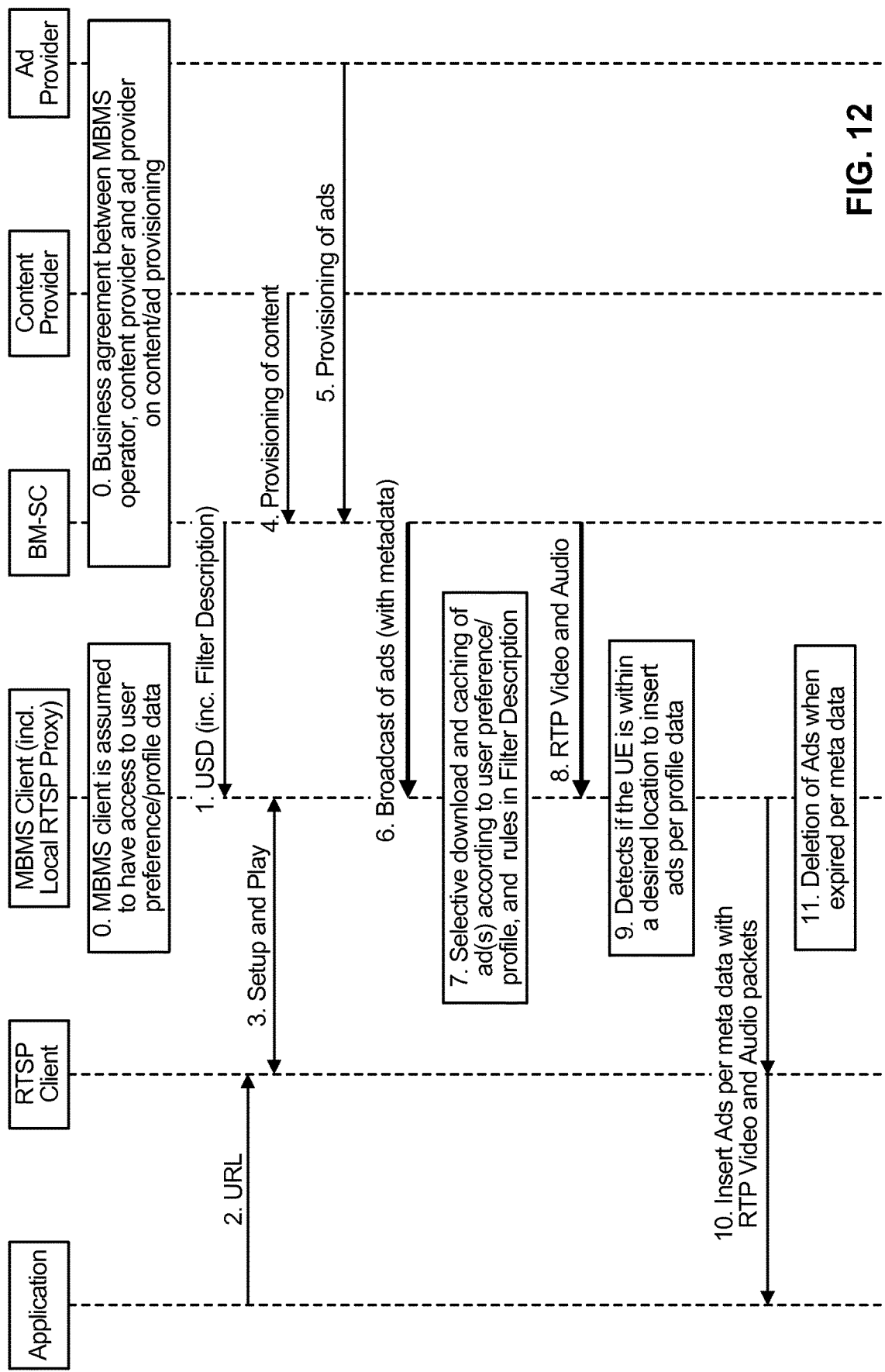
FIG. 12 is a sequence diagram illustrating an example method for MBMS client assisted ad selection and insertion for Real-Time Transport Protocol (RTP), in accordance with the techniques of this disclosure.

FIG. 12 is a sequence diagram illustrating an example method for MBMS client assisted ad selection and insertion for Real-Time Transport Protocol (RTP), in accordance with the techniques of this disclosure. In this example, a user profile is known to the MBMS client. When ads are sent, the FDT can include metadata for ads. Based on the user profile and Filter Description, the MBMS client may selectively download and cache ads. Optionally, the client device (UE) can decide whether to insert ads if within location area specified by profile data. FIG. 12 illustrates actions performed by various elements, including an application (e.g., media application 112 of FIG. 2), a DASH client (e.g., DASH client 110 of FIG. 2), an MBMS client (e.g., eMBMS middleware unit 100 of FIG. 2), a BM-SC, an ad decision server, a content provider, and an ad provider.

It is assumed, in the example of FIG. 12, that the MBMS client has access to UP/P data, and that there is a business agreement between the MBMS operator, the content provider, and the ad provider on content/ad provisioning. Initially, the BM-SC provides a USD, which includes a Filter Description, e.g., according to the example of FIG. 10. The application sends a URL to the DASH client, which then performs Setup and Play in accordance with RTP. The content provider provides the regular (or main) content to the BM-SC, and the ad provider provides the advertisement content to the BM-SC.

The BM-SC then begins broadcast of ads (with metadata). The MBMS client selectively downloads and caches ads according to the UP/P and rules in the Filter Description. The BM-SC uses RTP to send Video and Audio data. The MBMS client then determines whether the client device (UE) is within a desired location to insert ads per profile data. Assuming that the client device is in such a location, the MBMS client inserts ads per the metadata with RTP Video and Audio packets. The MBMS client then deletes the ads when they expire, per the metadata.

FIGS. 13A-13D are conceptual diagrams illustrating an example extension to a file delivery table (FDT) File element. In this example, the File element is extended to include a Group attribute, which may correspond to a groupID value as discussed above. In particular, file element 250 has been extended to include group attribute 252, named "mbms2014:groupID" with type xs:string, in this example.

It should be understood that in some examples, a client device may be configured to perform any or all of the techniques of the first example, the second example, and the third example described above. For example, different content distribution networks may support different mechanisms for targeted advertisement insertion, and a client device may implement the techniques of any or all of the first example, the second example, and/or the third example. As another example, a content distribution network may support any or all of the techniques of the first example, the second example, and/or the third example described above. Moreover, the techniques of the first example, the second example, and/or the third example described above may be performed together in any combination.

The FDT extension parameter of "groupID" shown in FIGS. 13A-13D is merely one example. Other techniques may be used in accordance with the techniques of this disclosure. For instance, in addition to or in the alternative to the use of an FDT extension parameter ("groupID") as metadata for an associated advertisement file, to enable the MBMS client to filter only the specifically suitable ads for the user, another possibility is to extend the existing USD. For example, a new element "groupIDFilter" may be added to the Filter Description fragment (where the Filter Description fragment is referenced by a file schedule instance in the Schedule Description fragment; the file schedule provides the transmission schedule for the ad file).

Figure 14:
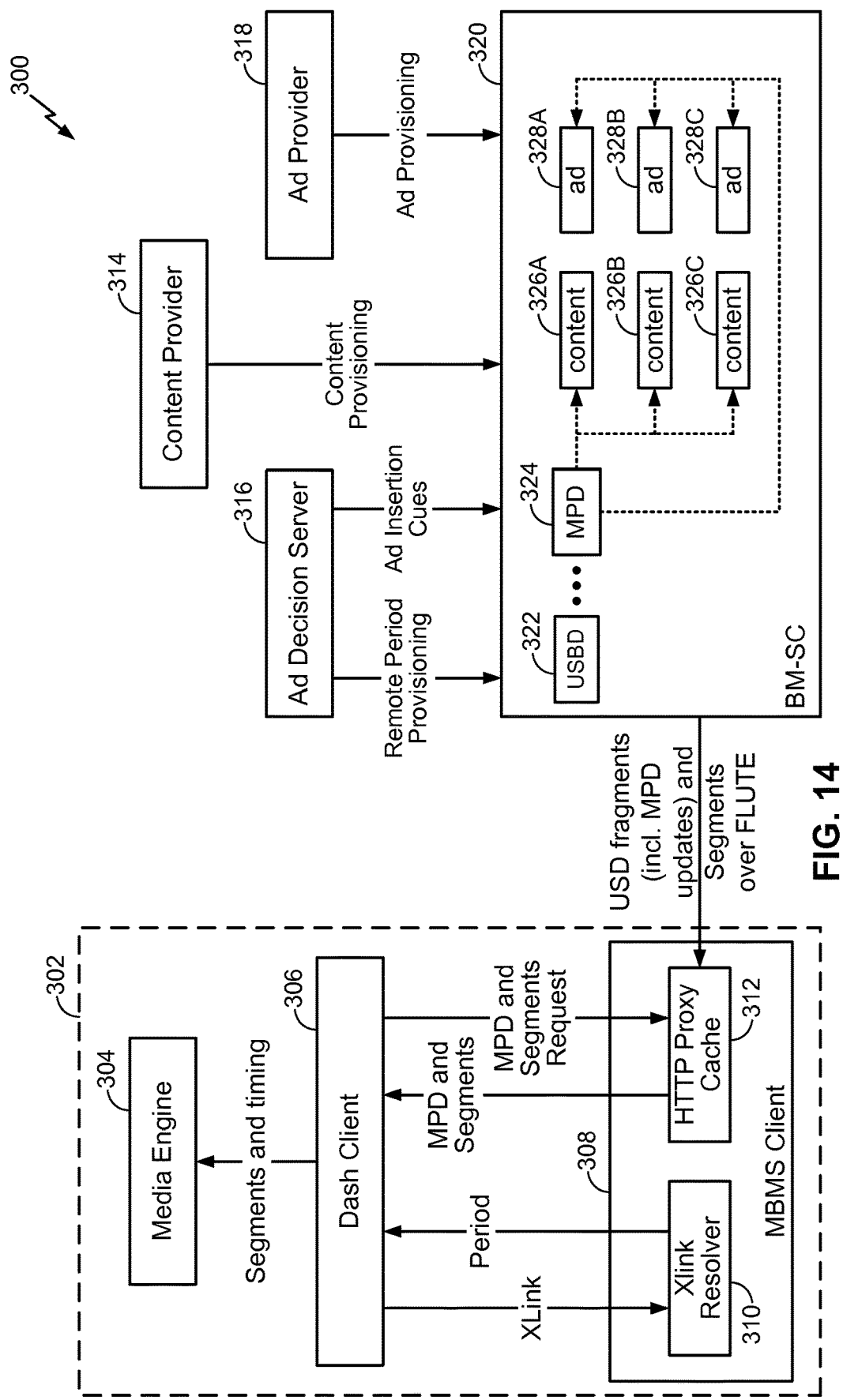
FIG. 14 is a block diagram illustrating another example system 300 that may perform the techniques of this disclosure.

FIG. 14 is a block diagram illustrating another example system 300 that may perform the techniques of this disclosure. The components of system 300 include functional entities involved in sourcing, scheduling, and delivery of DASH-formatted media content and targeted ads from a content provider and ad source to user equipment (UE) via the BM-SC. In this example, system 300 includes client device 302, content provider 314, ad decision server 316, ad provider 318, and Broadcast Multicast Service Center (BM-SC) 320. Client device 302 includes media engine 304, DASH client 306, and MBMS client 308. Client device 302 represents an example of UE. MBMS client 308 further includes XLink resolver 310 and HTTP proxy cache 312. BM-SC 320 includes data for USBD 322, MPD 324, content 326A-326C (content 326), and advertisements (ads) 328A-328C (ads 328).

In general, content provider 314 provides content 326 to BM-SC 320. Ad decision server 316 signals when advertisements are to be inserted (using ad insertion cues) and provisions remote periods for the advertisements. Ad provider 318 provides advertisements 328 to BM-SC 320. Advertisements 328A-328C may each correspond to different groups of users, in order to target advertisements to the users, as discussed above.

MBMS client 308 subscribes to a broadcast or multicast group in order to receive data from one or more of contents 326. Furthermore, as explained in greater detail below with respect to FIGS. 15A and 15B, MBMS client 308 may selectively receive one of advertisements 328A-328C to be inserted into an advertisement break. MBMS client 308 stores the content and advertisement data in HTTP proxy cache 312. In this manner, DASH client 306 may retrieve media data (e.g., main content data and advertisement data) by submitting HTTP requests to MBMS client 308, which in turn sends MPD data and segments to DASH client 306. In order to select appropriate advertisement data, DASH client 306 may send an XLink to MBMS client 308. XLink resolver 310 may resolve the XLink in order to determine the advertisement data to be received.

In the example architecture of FIG. 14, ad-related information may be declared using MPD 324 and Segments of content 326, and ad decisions may be initiated by a request of DASH client 306 for the MPD and the resources it describes, i.e., a remote Period element and Segments. If the occurrence time of the ad break is known at the time of MPD generation, the MPD containing the remote Period element could be sent to the DASH client well in advance of the ad break. Otherwise, it may be necessary to rely on MPD update functionality, for example, based on synchronous MPD updates with periodicity defined by MPD@minimumUpdatePeriod, to signal the impending opportunity for targeted ad insertion. The operating scenario of unpredictable ad breaks will be assumed in the following discussion.

Although the nominal interaction between DASH client 306 and the MPD server (where the latter is assumed to reside in the UE (that is, client device 302), and p/o MBMS client 308, which includes a local HTTP proxy and cache 312) for acquisition of the latest MPD is periodic, the occurrence of ad breaks can be purely asynchronous, for example, occurring during an injury time-out in a football game. Depending on the expected set-up time of the ad break—starting from the incident that triggers the ad break to the actual splice time of the ad insertion, the MPD@minimumUpdatePeriod value can be adjusted accordingly so that such dynamic event will not be missed by DASH client 306. The HTTP interaction for MPD updates, most likely via conditional GET, may occur locally within the UE so that no unicast network traffic is incurred, and most of the time, the MPD previously acquired by DASH client 306 is still valid. When updated, the MPD may carry a pointer to an external Period element via Period@xlink:href.

As part of the HTTP interaction with MBMS client 308, DASH client 306 may pass state information regarding the UE/local user to MBMS client 308. Examples of such state information include cookies, subscription information, and content consumption history data. State information could be provided to MBMS client 308 during nominal request/ response for the MPD or Media Segments, or during the XLink resolution procedure. MBMS client 308 may utilize some mechanism, outside the scope of TS 26.346 (e.g., access to local user profile/preference information, content consumption history, or content recommendation engine), to determine a specific group or profile identifier for the user. Such "groupID" may be used as an indicator of suitable or preferential ad contents for that user. When ad contents are broadcast (where a variety of advertisement files are targeted to different users), the MBMS client uses the groupID as a filter to download and cache one or more specific ads, to be provided to the DASH client upon request later on. Broadcast delivery of ads may occur well in advance of the ad break (e.g., overnight before the football game the next day), or closer in time preceding the actual ad break.

Selective download and caching of ads by MBMS client 308 is possible as long as it has acquired the local state information and mapped that data to the groupID value of the user. Different ways are possible to convey groupID as metadata for the associated ads to enable selective ad reception by the MBMS client. For example, a FLUTE FDT extension attribute groupID could be specified for the ad file identified by the TOI and Content-Location. It is also possible to extend the existing Filter Description fragment by adding a new child element groupIDFilter under the filterData element, as identifier for the corresponding ad file whose delivery schedule is announced by an instance of file schedule.

In the resolution of the XLink, MBMS client 308 may return a remote Period element customized (e.g., by groupID) to the user. That Period element contains references to the ad content for the duration of the Period, including Segment URL information. DASH client 306 may then use that information to fetch Segments for the ad content at the appropriate times of the ad break. Because the corresponding ad content has been already downloaded and cached by MBMS client 308 (cached within HTTP proxy cache 312), it may be returned to DASH client 306 and in turn to the media player/application (e.g., media engine 304) for rendering during the ad break.

Figure 15A:
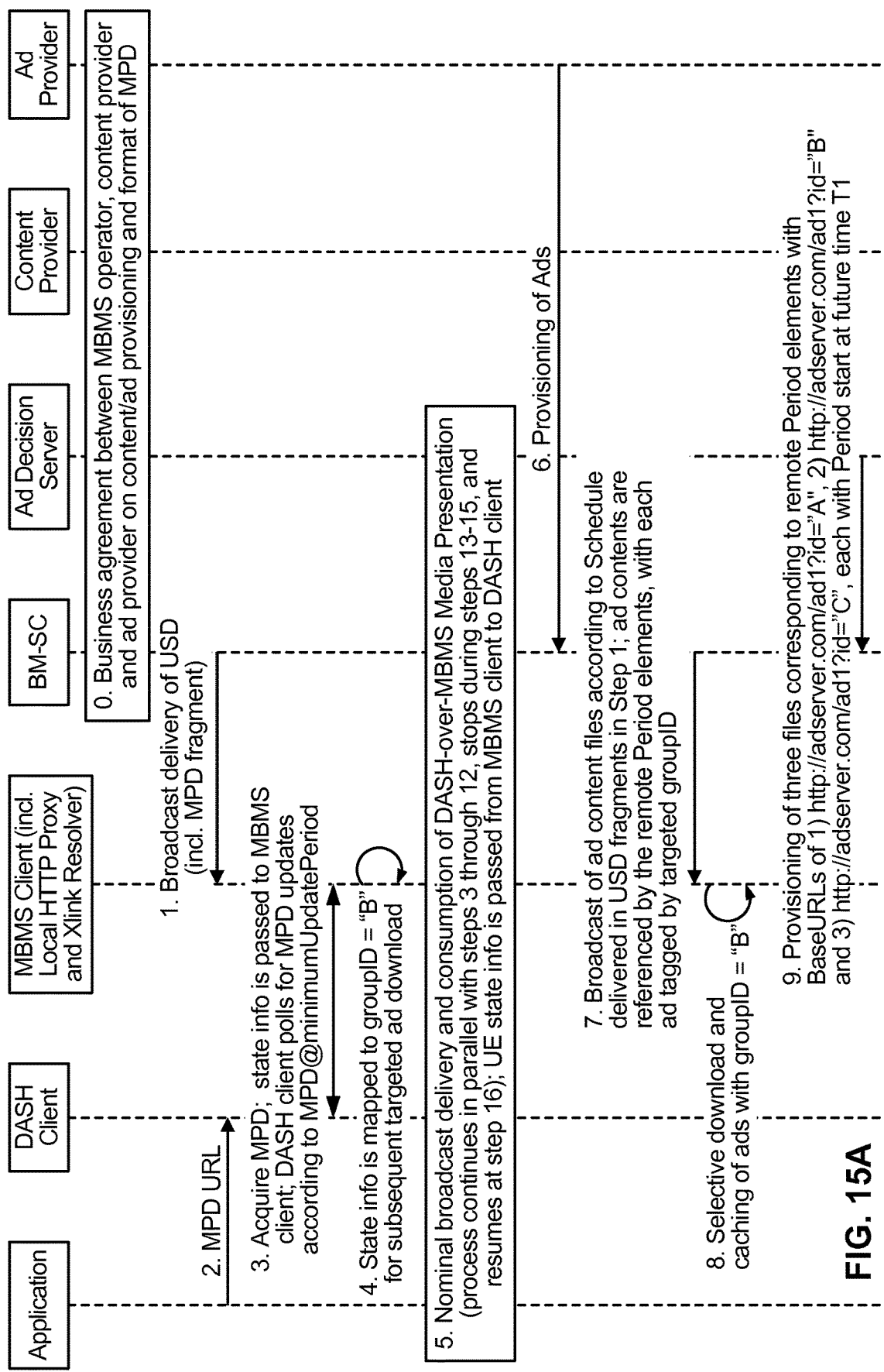
FIGS. 15A and 15B are sequence diagrams illustrating an example method in accordance with the techniques of this disclosure.
Figure 15B:
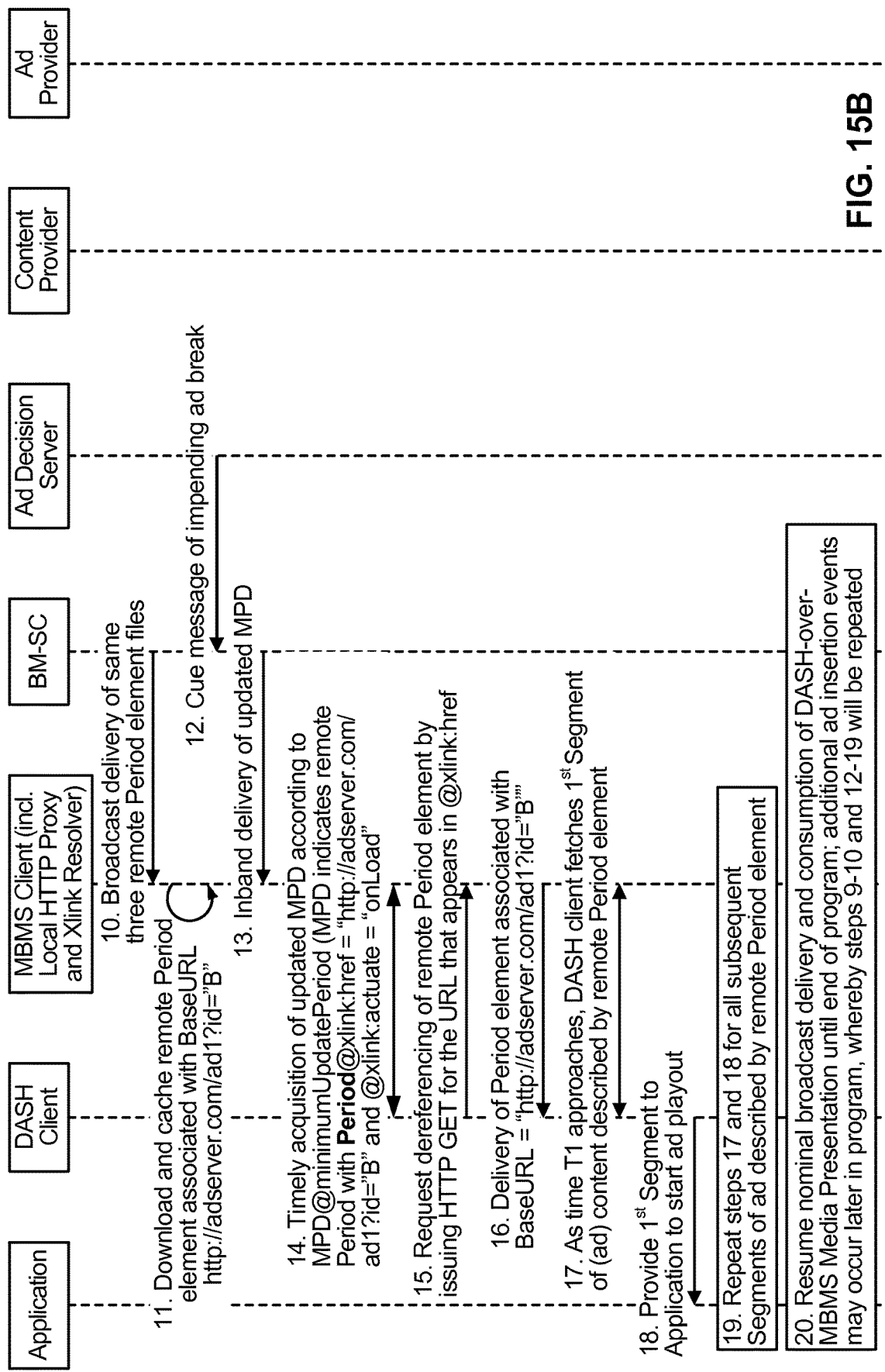

FIGS. 15A and 15B are sequence diagrams illustrating an example method in accordance with the techniques of this disclosure. The method of FIGS. 15A and 15B may be performed by the components of system 300 of FIG. 14, although the other systems may also perform this method. It is assumed that there is a business agreement between the MBMS operator, content provider 314, and ad provider 318 regarding content and advertisement provisioning and a format of MPD 324. FIGS. 15A and 15B illustrate actions performed by various elements, including an application (e.g., media application 112 of FIG. 2 or media engine 304 of FIG. 14), a DASH client (e.g., DASH client 110 of FIG. 2 or DASH client 306 of FIG. 14), an MBMS client (e.g., eMBMS middleware unit 100 of FIG. 2 or MBMS client 308 of FIG. 14), a BM-SC (e.g., BM-SC 320 of FIG. 14), an ad decision server (e.g., ad decision server 316 of FIG. 14), a content provider (e.g., content provider 314 of FIG. 14), and an ad provider (e.g., ad provider 318 of FIG. 14).

Initially, BM-SC 320 may broadcast delivery of a USD (including an MPD fragment) to MBMS client 308. A media application (e.g., media engine 304) may request send an MPD URL to DASH client 306, which in turn may acquire the MPD (e.g., MPD 324) from MBMS client 308 (which may cache the MPD in HTTP proxy cache 312). DASH client 306 may also pass state information to MBMS client 308, which may indicate a set of advertisement data (e.g., an advertisement group) to be obtained for a user of client device 302. DASH client 306 may poll for MPD updates according to MPD@minimumUpdatePeriod, which may be signaled in the original MPD. MBMS client 308 may then map the state information to a group identifier, e.g., groupID="B" in this example, for subsequent targeted advertisement download.

For the main content, there may be normal broadcast delivery and consumption of DASH-over-MBMS Media Presentation. Subsequently, ad provider 318 may provision an advertisement to BM-SC 320. BM-SC 320 may broadcast the advertisement content files according to a Schedule delivered in USD fragments, as discussed above. Advertisement content (e.g., advertisements 328) may be referenced by the remote Period elements, with each ad tagged by a targeted groupID. Based on the mapping discussed above, MBMS client 308 may selectively download and cache (in HTTP proxy cache 312) advertisements tagged with groupID="B."

Ad decision server 316 may provide, to BM-SC 320, three files corresponding to remote Period elements with BaseURLs of 1) http://adserver.com/ad1?id="A", 2) http://adserver.com/ad1?id="B" and 3) http://adserver.com/ad1?id="C", each with Period start at future time T1. BM-SC 320 may then broadcast these three remote Period element files. MBMS client 308 may download and cache only the remote Period element associated with BaseURL http://adserver.com/ad1?id="B," based on the mapping discussed above. BM-SC 320 may also deliver, in band, an updated MPD for the Media Presentation.

According to the MPD minimum update period, DASH client 306 may request an updated MPD from MBMS client 308. The updated MPD may signal a remote period with Period@xlink:href="http://adserver.com/ad1?id="B" and @xlink:actuate="onLoad." DASH client 306 may further request dereferencing of the remote Period element by issuing an HTTP GET request for the URL that appears in @xlink:href. MBMS client 308 may deliver the Period element associated with BaseURL="http://adserver.com/ad1?id="B." As time T1 approaches, DASH client 306 may fetch segments of advertisement content described by the remote Period element from MBMS client 308 (which has cached the segments in HTTP proxy cache 312), and then provide the segments to the media application (e.g., media engine 304).

In this manner, FIGS. 15A and 15B represent an example of a method including, by a DASH client: determining a set of advertisement group identifiers associated with advertisement media data of a plurality of advertisement groups, wherein the advertisement media data is to be played during an advertisement break for main media content, selecting, based at least in part on characteristics of a user for the DASH client, one of the advertisement groups from the set, retrieving advertisement media data of the selected advertisement group, and providing the advertisement media data to a media application.

Likewise, FIGS. 15A and 15B represent an example of a method including, by an MBMS middleware unit: receiving advertisement media data of one or more advertisement groups, receiving an identifier value for one of the advertisement groups from a dynamic adaptive streaming over HTTP (DASH) client of the client device, extracting the advertisement media data of the advertisement group corresponding to the identifier value, and providing the extracted advertisement media data to the DASH client.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data, the method comprising, by a dynamic adaptive streaming over HTTP (DASH) client, wherein the DASH client is included in a client device:
    determining a set of advertisement group identifiers associated with advertisement media data of a plurality of advertisement groups, wherein the advertisement media data is to be played during an advertisement break for main media content, wherein the main media content is associated with a manifest file;
    retrieving an update to the manifest file, wherein the update defines a remote Period that corresponds to the advertisement media data, wherein the update to the manifest file specifies a template for an extensible markup language (XML) linking language (XLink) uniform resource locator (URL) including an identifier attribute;
    selecting, based at least in part on characteristics of a user for the DASH client, one of the advertisement groups from the set;
    sending data representing the selected advertisement group to a multimedia broadcast multicast service (MBMS) client of the client device, the data representing the selected advertisement group indicating the advertisement media data of the selected advertisement group and of the remote Period to be prefetched by the MBMS client, and wherein sending the data representing the selected advertisement media group comprises sending the data representing the selected advertisement media group separately from a dereferenced XLink URL;
    assigning an identifier value corresponding to the selected advertisement group to the identifier attribute of the XLink URL according to the template;
    dereferencing the XLink URL including the identifier value corresponding to the selected advertisement group to retrieve the prefetched advertisement media data of the selected advertisement group and of the remote Period from the MBMS client of the client device, wherein dereferencing the XLink URL comprises sending a request specifying the XLink URL including the identifier value to the MBMS client of the client device; and
    providing the retrieved advertisement media data to a media application.

2. The method of claim 1, further comprising, by the multimedia broadcast multicast service (MBMS) client of the client device:
    receiving the XLink URL including the identifier value from the DASH client;
    receiving data for the remote Period via a broadcast transport or a multicast transport;
    determining that the data for the remote Period matches the XLink URL when a file delivery table (FDT) for the broadcast transport or the multicast transport includes an identifier value that matches the identifier value of the XLink URL; and
    in response to determining that the data for the remote Period matches the XLink URL, delivering the data for the remote Period to the DASH client.

3. The method of claim 2, wherein receiving the data for the remote Period comprises receiving data for each of the advertisement groups.

4. The method of claim 2, wherein receiving the data for the remote Period comprises discarding data for all of the advertisement groups other than the advertisement group corresponding to the identifier value of the XLink URL.

5. The method of claim 1, the method further comprising, by the multimedia broadcast multicast service (MBMS) client of the client device:
receiving the XLink URL including the identifier value from the DASH client;
receiving data for the remote Period via a broadcast transport or a multicast transport;
determining that the data for the remote Period matches the XLink URL when a value of a groupIDFilter syntax element of a Filter Description fragment corresponds to the identifier value of the XLink URL; and
in response to determining that the data for the remote Period matches the XLink URL, delivering the data for the remote Period to the DASH client.

6. The method of claim 1, wherein retrieving comprises: obtaining data that defines a manifest file update period, wherein retrieving the update comprises retrieving the update according to the manifest file update period.

7. The method of claim 6, wherein the data defining the manifest file update period comprises an MPD@minimumUpdatePeriod element of the manifest file.

8. The method of claim 1, wherein the manifest file comprises a media presentation description.

9. The method of claim 1, wherein sending the data representing the one of the advertisement groups to the MBMS client comprises providing, by the DASH client, state information related to the user or device to the multimedia broadcast multicast service (MBMS) client of the client device, the method further comprising:
receiving, by the MBMS client, the advertisement media data via a broadcast transport or a multicast transport; and
mapping, by the MBMS client, the state information to a unique advertisement group identifier.

10. The method of claim 9, wherein the state information includes one or more of cookies, subscription information, User Preference & Profile (UP/P) data, and usage history.

11. The method of claim 1, wherein selecting comprises selecting based on at least one of user preference and profile data, content consumption history, or an advertisement recommendation engine.

12. A non-transitory computer-readable storage medium having stored thereon instructions for a dynamic adaptive streaming over HTTP (DASH) client included in a client device that, when executed, cause a processor of the client device to:
determine a set of advertisement group identifiers associated with advertisement media data of a plurality of advertisement groups, wherein the advertisement media data is to be played during an advertisement break for main media content, wherein the main media content is associated with a manifest file;
retrieve an update to the manifest file, wherein the update defines a remote Period that corresponds to the advertisement media data, wherein the update to the manifest file specifies a template for an extensible markup language (XML) linking language (XLink) uniform resource locator (URL) including an identifier attribute;
select, based at least in part on characteristics of a user of the client device, one of the advertisement groups from the set;
send data representing the selected advertisement group to a multimedia broadcast multicast service (MBMS) client of the client device, the data representing the selected advertisement group indicating the advertisement media data of the selected advertisement group and of the remote Period to be prefetched by the MBMS client, and wherein the instructions that cause the processor to send the data representing the selected advertisement media group comprise instructions that cause the processor to send the data representing the selected advertisement media group separately from a dereferenced XLink URL;
assign an identifier value corresponding to the selected advertisement group to the identifier attribute of the XLink URL according to the template;
dereference the XLink URL including the identifier value corresponding to the selected advertisement group to retrieve the prefetched advertisement media data of the selected advertisement group and of the remote Period from the MBMS client of the client device, including sending a request specifying the XLink URL including the identifier value to the MBMS client of the client device; and
provide the retrieved advertisement media data to a media application.

13. The non-transitory computer-readable storage medium of claim 12, having stored thereon instructions further comprising instructions for the multimedia broadcast multicast service (MBMS) client, wherein the instructions for the MBMS client cause the processor to:
receive the XLink URL including the identifier value from the DASH client;
receive data for the remote Period via a broadcast transport or a multicast transport;
determine that the data for the remote Period matches the XLink URL when a file delivery table (FDT) for the broadcast transport or the multicast transport includes an identifier value that matches the identifier value of the XLink URL; and
in response to determining that the data for the remote Period matches the XLink URL, deliver the data for the remote Period.

14. The non-transitory computer-readable storage medium of claim 13, wherein the instructions that cause the processor to receive the data for the remote Period comprise instructions that cause the processor to receive data for each of the advertisement groups.

15. The non-transitory computer-readable storage medium of claim 13, wherein the instructions that cause the processor to receive the data for the remote Period comprise instructions that cause the processor to discard data for all of the advertisement groups other than the advertisement group corresponding to the identifier value of the XLink URL.

16. The non-transitory computer-readable storage medium of claim 12, having stored thereon instructions further comprising instructions that cause the multimedia broadcast multicast service (MBMS) client of the client device to:
receive the XLink URL including the identifier value from the DASH client;
receive data for the remote Period via a broadcast transport or a multicast transport;
determine that the data for the remote Period matches the XLink URL when a value of a groupIDFilter syntax element of a Filter Description fragment corresponds to the identifier value of the XLink URL; and
in response to determining that the data for the remote Period matches the XLink URL, deliver the data for the remote Period to the DASH client.

17. The non-transitory computer-readable storage medium of claim 12, wherein the instructions that cause the processor to retrieve the update comprise instructions that cause the processor to obtain data that defines a manifest file update period, wherein the instructions that cause the processor to retrieve the update comprise instructions that cause the processor to retrieve the update according to the manifest file update period.

18. The non-transitory computer-readable storage medium of claim 17, wherein the data defining the manifest file update period comprises an MPD@minimumUpdatePeriod element of the manifest file.

19. The non-transitory The computer-readable storage medium of claim 12, wherein the manifest file comprises a media presentation description.

20. A method of retrieving media data, the method comprising:
  by a dynamic adaptive streaming over HTTP (DASH) client included in a client device:
    retrieving an update to a manifest file, the update defining a remote Period that corresponds to advertisement media data, the update specifying a template for an extensible markup language (XML) linking language (XLink) uniform resource locator (URL) including an identifier attribute, the advertisement media data to be played during an advertisement break for main media content, the main media content associated with the manifest file;
    assigning an identifier value corresponding to a selected advertisement group to the identifier attribute of the XLink URL according to the template, the selected advertisement group selected from a plurality of advertisement groups based at least in part on characteristics of a user for the DASH client, a set of advertisement group identifiers associated with advertisement media data of the plurality of advertisement groups;
    sending data representing the selected advertisement group to a multimedia broadcast multicast service (MBMS) client included in the client device, the data representing the selected advertisement group indicating the advertisement media data of the selected advertisement group and of the remote Period to be prefetched by the MBMS client, and wherein sending the data representing the selected advertisement media group comprises sending the data representing the selected advertisement media group separately from a dereferenced XLink URL;
    dereferencing the XLink URL including the identifier value corresponding to the selected advertisement group to retrieve the prefetched advertisement media data of the selected advertisement group and of the remote Period from the MBMS client of the client device, the dereferencing the XLink URL comprising sending a request specifying the XLink URL including the identifier value to the MBMS client included in the client device; and
    providing the retrieved advertisement media data to a media application.

21. The method of claim 20, wherein the MBMS client included in the client device, to which the DASH client included in the client device sent the request specifying the XLink URL including the identifier value, is configured to receive broadcast content via a broadcast transmission from a remote Broadcast Multicast Service Center (BM-SC) for unicast retrieval by the DASH client included in the client device.

22. The method of claim 20, wherein the MBMS client included in the client device, to which the DASH client included in the client device sent the request specifying the XLink URL including the identifier value, is configured to receive the update to the manifest file via a broadcast transmission from a remote Broadcast Multicast Service Center (BM-SC) for the retrieving by the DASH client included in the client device.

23. A non-transitory computer-readable storage medium having stored thereon instructions that, when executed, cause a processor of a client device to perform a method comprising:
  by a dynamic adaptive streaming over HTTP (DASH) client included in the client device:
    retrieving an update to a manifest file, the update defining a remote Period that corresponds to advertisement media data, the update specifying a template for an extensible markup language (XML) linking language (XLink) uniform resource locator (URL) including an identifier attribute, the advertisement media data to be played during an advertisement break for main media content, the main media content associated with the manifest file;
    assigning an identifier value corresponding to a selected advertisement group to the identifier attribute of the XLink URL according to the template, the selected advertisement group selected from a plurality of advertisement groups based at least in part on characteristics of a user for the DASH client, a set of advertisement group identifiers associated with advertisement media data of the plurality of advertisement groups;
    sending data representing the selected advertisement group to a multimedia broadcast multicast service (MBMS) client included in the client device, the data representing the selected advertisement group indicating the advertisement media data of the selected advertisement group and of the remote Period to be prefetched by the MBMS client, and wherein sending the data representing the selected advertisement media group comprises sending the data representing the selected advertisement media group separately from a dereferenced XLink URL;
    dereferencing the XLink URL including the identifier value corresponding to the selected advertisement group to retrieve the prefetched advertisement media data of the selected advertisement group and of the remote Period from the MBMS client of the client device, the dereferencing the XLink URL comprising sending a request specifying the XLink URL including the identifier value to the MBMS client included in the client device; and
    providing the retrieved advertisement media data to a media application.

24. The non-transitory computer-readable storage medium of claim 23, wherein the MBMS client included in the client device, to which the DASH client included in the client device sent the request specifying the XLink URL including the identifier value, is configured to receive broadcast content via a broadcast transmission from a remote Broadcast Multicast Service Center (BM-SC) for unicast retrieval by the DASH client included in the client device.

25. The non-transitory computer-readable storage medium of claim 23, wherein the MBMS client included in the client device, to which the DASH client included in the client device sent the request specifying the XLink URL including the identifier value, is configured to receive the update to the manifest file via a broadcast transmission from a remote Broadcast Multicast Service Center (BM-SC) for the retrieving by the DASH client included in the client device.

* * * * *